US008090730B2

(12) United States Patent
Shahabi et al.

(10) Patent No.: US 8,090,730 B2
(45) Date of Patent: Jan. 3, 2012

(54) METHODS FOR FAST PROGRESSIVE EVALUATION OF POLYNOMIAL RANGE-SUM QUERIES ON REAL-TIME DATACUBES

(75) Inventors: Cyrus Shahabi, Irvine, CA (US); Rolfe Schmidt, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 1933 days.

(21) Appl. No.: 10/310,667

(22) Filed: Dec. 4, 2002

(65) Prior Publication Data

US 2003/0204499 A1  Oct. 30, 2003

Related U.S. Application Data

(60) Provisional application No. 60/337,109, filed on Dec. 4, 2001.

(51) Int. Cl.
*G06F 7/00* (2006.01)
*G06F 17/30* (2006.01)

(52) U.S. Cl. ............... 707/756; 707/769; 707/E17.014; 707/E17.14

(58) Field of Classification Search ............... 707/1, 10, 707/102–104.1, 100, 2–5, 8, 600, 607, 713, 707/756, 769, E17.014, E17.14; 704/9
See application file for complete search history.

(56) References Cited

U.S. PATENT DOCUMENTS

| 5,351,083 | A | * | 9/1994 | Tsukagoshi | 375/240.16 |
|---|---|---|---|---|---|
| 5,647,058 | A | * | 7/1997 | Agrawal et al. | 707/1 |
| 5,701,454 | A | * | 12/1997 | Bhargava et al. | 707/2 |
| 5,799,300 | A | * | 8/1998 | Agrawal et al. | 707/5 |
| 5,819,255 | A | | 10/1998 | Celis et al. | |
| 5,864,845 | A | * | 1/1999 | Voorhees et al. | 707/5 |
| 5,867,609 | A | * | 2/1999 | Shamoon et al. | 382/278 |
| 5,890,151 | A | * | 3/1999 | Agrawal et al. | 707/5 |
| 5,926,820 | A | * | 7/1999 | Agrawal et al. | 707/200 |
| 5,940,825 | A | | 8/1999 | Castelli et al. | |
| 5,987,459 | A | * | 11/1999 | Swanson et al. | 707/6 |
| 6,006,214 | A | | 12/1999 | Carey et al. | |
| 6,070,133 | A | * | 5/2000 | Brewster et al. | 704/9 |
| 6,141,655 | A | * | 10/2000 | Johnson et al. | 707/2 |
| 6,154,746 | A | * | 11/2000 | Berchtold et al. | 707/100 |
| 6,161,103 | A | * | 12/2000 | Rauer et al. | 707/4 |
| 6,173,275 | B1 | | 1/2001 | Caid et al. | |
| 6,266,371 | B1 | * | 7/2001 | Kondo | 375/240.16 |
| 6,292,577 | B1 | | 9/2001 | Takahashi | |
| 6,334,125 | B1 | * | 12/2001 | Johnson et al. | 707/3 |
| 6,351,491 | B1 | * | 2/2002 | Lee et al. | 382/239 |
| 6,389,169 | B1 | | 5/2002 | Stark et al. | |
| 6,397,211 | B1 | | 5/2002 | Cooper | |
| 6,424,967 | B1 | * | 7/2002 | Johnson et al. | 707/3 |
| 6,438,538 | B1 | | 8/2002 | Goldring | |
| 6,487,546 | B1 | * | 11/2002 | Witkowski | 707/1 |

(Continued)

OTHER PUBLICATIONS

Wu et al.—"Using Wavelet Decomposition to Support Progressive and Approximate Rang-Sum Queries over Data Cubes" AC 2000 (pp. 414-421).*

(Continued)

*Primary Examiner* — John E Breene
*Assistant Examiner* — Anh Ly
(74) *Attorney, Agent, or Firm* — Fish & Richardson P.C.

(57) ABSTRACT

Provided are methods, computer programs and systems that optimize database queries using a wavelet transform of the query. Also provided are methods and systems for optimal disk placement for wavelet data.

35 Claims, 16 Drawing Sheets

U.S. PATENT DOCUMENTS

| | | | |
|---|---|---|---|
| 6,549,907 B1* | 4/2003 | Fayyad et al. | 707/101 |
| 6,633,882 B1* | 10/2003 | Fayyad et al. | 707/101 |
| 6,741,655 B1* | 5/2004 | Chang et al. | 375/240.26 |
| 6,751,363 B1* | 6/2004 | Natsev et al. | 707/3 |
| 6,760,714 B1* | 7/2004 | Caid et al. | 382/116 |
| 6,760,724 B1* | 7/2004 | Chakrabarti et al. | 707/4 |
| 7,177,854 B2* | 2/2007 | Chun et al. | 707/2 |
| 2002/0138481 A1* | 9/2002 | Aggarwal et al. | 707/6 |
| 2003/0093424 A1* | 5/2003 | Chun et al. | 707/7 |
| 2003/0126143 A1* | 7/2003 | Roussopoulos et al. | 707/100 |
| 2003/0204499 A1 | 10/2003 | Shahabi | |
| 2003/0217047 A1* | 11/2003 | Marchisio | 707/3 |
| 2004/0249774 A1* | 12/2004 | Caid et al. | 707/3 |

OTHER PUBLICATIONS

Chan et al. "Hierarchical Cubes for range-Sum Queries" ACM the 25th VLDB conference, Edinburgh, Scotland, (pp. 675-686).*

"The Dynamic Data Cube"—S. Geffiner, D. Agrawal & A. El Abbadi—Department of Computer Science, University of California—(pp. 237-253 or 1-12) , Jan. 1, 2000, SpringerLink vol. 1777/2000.*

"Rang-sum queries in dynamic OLAP data cubes"—Hua-Gang Li, Tok Wang Ling, Sin Yeung Lee and Zheng Xuan Loh—Cooperative database systems for advanced applications, 2001, COBAS 2001, Apr. 23-24, 2001 (pp. 74-81).*

"Approximate computation of multidimensional aggregates of sparse data using wavelets"—Jeffrey scott Vitter and Min Wang—ACM SIGMOD record, vol. 28, issue 2 , ACM—Jun. 1999, (pp. 193-204).*

"Using wavelet decomposition tosupport progressive and approximate range-sum queries over data cubes"—Yi-Leh Wu, Divyakant Agrawal and Amr El Abbadi—Conference on information and knowledge management, proceedings of the ninth International conference on information knowledge management—ACM—2000, (pp. 414-421).*

Chan et al.—"Efficient time series matching by wavelets"—Data Engineering, 1999, processdings, 15$^{th}$ International Conference Mar. 23-26, 1999 (pp. 126-133).*

Ivan Popivannov—"Efficient similarity queries over time series data using wavelets"—Computer Science, University of Toronto, 2001 (pp. 1-73).*

Chakrabarti, et al., "Approximate Query Processing Using Wavelets", *Proceedings of the 26$^{th}$ VLDB Conference*, Cairo, Egypt, pp. 111-122, Sep. 10-14, 2000.

Chan, et al., Hierarchical Cubes for Range-Sum Queries *Proceedings of the 25$^{th}$ VLDB Conference*, Edinboro, Scotland, pp. 675-686, Sep. 7-10, 1999.

Geffner, et al., "The Dynamic Data Cube", 7$^{th}$ International Cnference on Extending Database Technology, 7$^{th}$ *International Conference on Exending Database Technology*, Kostanz, Germany, pp. 237-253, Mar. 27-31, 2000.

Gilbert, et al., "Optimal and Approximate Computation of Summary Statistics for Range Aggregates", *PODS, 2001, Proceedings of the Twentieth ACM SIGACT-SIGMOD-SIGART Symposium on Principles of Database Systems*, pp. 227-236, 2001.

Gilbert, et al., "Surfing Wavelets on Streams: One-Pass Summaries for Approximate Aggregate Queries", *Proceedings of the 27$^{th}$*, Roma, Italy, pp. 79-88, Sep. 11-14, 2001.

Gunopulos, et al., "Approximating Multi-Dimensional Aggregate Range Queries Over Real Attributes", *SIGMOD 2000. Proceedings ACM SIGMOD International Conference on Management of Data*, Dallas, Texas, pp. 463-474, 2000.

Hellerstein, et al., "Online Aggregation", *SIGMOD 1997, Proceedings ACM SIGMOD International Conference on Management of Data*, pp. 171-182, ACM Press, 1997.

Ho, et al., "Range Queries in OLAP Data Cubes", *SIGMOD 1997, Proceedingss ACM SIGMOD International Conference on Management of Data*, pp. 73-88, ACM Press, 1997.

Lazaridis, et al. "Progressive Approximate Aggregate Queries with a Multi-Resolution Tree Structure", *SIGMOD 2001, Proceedings ACM SIGMOD International Conference on Management of Data*, pp. 401-412, 2001.

Poosala, et al., "Fast Approximate Answers to Aggregate Queries on a Data Cube", *SSDBM 1999, 11$^{th}$ International Conference on Scientific and Statistical Database Management*, pp. 24-33, IEEE Computer Society, 1999.

Riedewald, et al., "pCube: Update-Efficient Online Aggregation with Progressive Feedback and Error Bounds", *SSDBM 2000, Proceedings of he 12$^{th}$ International Conference on Scientific and Statistical Database Management*, pp. 95-108, 2000.

Riedewald, et al., "Flexible Data Cubes for Online Aggregation", *ICDT 2001, 8$^{th}$ International Conference on Database Theory*, pp. 159-173, 2001.

Schmidt, et al., "Wavelet Based Density Estimators for Modeling Multidimensional Data Sets", *SIAM Workshop on Mining Scientific Datasets*, Chicago, Illinois, Apr. 2001.

Schmidt, et al., "ProPolyne: A Fast Wavelet-Based Algorithm for Progressive Evaluation of Polynomal Rnage-Sum Queries", *Advances in Database Technology—EDBT 2002, 8$^{th}$ International Conference on Extending Database Technology*, Lecture Notes in Computer Science, Springer, 2002.

Shanmugasundaram, et al., "Compresed Data Cubes for OLAP Aggregate Query Approximation on Continuous Dimensions", *Fifth ACM SIGKDD International Conference on Knowledge Discovery and Data Mining*, pp. 223-232, Aug. 1999.

Shao, "Multivariate and Multidimensional OLAP", *Advances in Database Technology—EDTB '98, 6$^{th}$ International Conference on Extending Database Technology,*, vol. 1377 of Lecture Notes in Computer Science, pp. 120-134, Springer, 1998.

Vitter, et al., "Approximate Computation of Multidimensional Aggregates of Sparse Data Using Wavelets", *SIGMOD 1999, Proceedings of the ACM SIGMOD International Conference on the Management of Data*, pp. 193-204, ACM Press, 1999.

Wu, et al., "Using Wavelet Decomposition to Support Progressive and Approximate Range-sum Queries over Data Cubes", *CIKM 2000, Proceedings of the 9$^{th}$ International Conference on Information and Knowledge Management*, pp. 414-421, ACM 2000.

Zhao, et al., "Simultaneous Optimization and Evaluation of Multiple Dimensional Queries", *SIGMOD 1998, Proceedings ACM SIGMOD International Conference on Management of Data*, pp. 271-282, ACM Press, 1998.

Wu, et al., "A Comparison of DFT and DWT Based Similarity Search in Time-Series Databases", *ACM Press*, pp. 488-495, Nov. 2000.

Keogh, et al., "Ensemble-Index: A New Approach to Indexing Large Databases", *ACM Press*, pp. 117-127, Aug. 2001.

Loh, et al., "Index Interpolation: An Approach to Subsequence Matching Supporting Normalization Transform in Time-Series Databases", *ACM Press*, pp. 480-487, Nov. 2000.

Schmidt et al., "How to Evaluate Multiple Range-Sum Queries Progressively," Proc. of PODS, p. 3-5 published by ACM (2002).

Shahabi, Cyrus "AIMS: An Immersidata Management System" Proceedings of the 2003 CIDR Conference (2003).

* cited by examiner

BATCH-BIGGEST-B

Preprocessing: Compute the wavelet transform of the data density function and store with reasonable random-access cost.

Input: A batch of range-sum queries and an importance function.

1. For each query in the batch, initialize its progressive estimate to be zero.
2. Compute the wavelet transform of each query in the batch, and construct a list of its nonzero wavelet coefficients.
3. Merge these lists into a master list.
4. Compute the importance of each wavelet in the master list, and build a max-heap from the set.
5. Extract the maximum element from the heap; retrieve the corresponding data wavelet coefficients and use it to increment the progressive estimate of each query in the batch according to Equation 2. Repeat until heap is empty.

*FIG. 7*

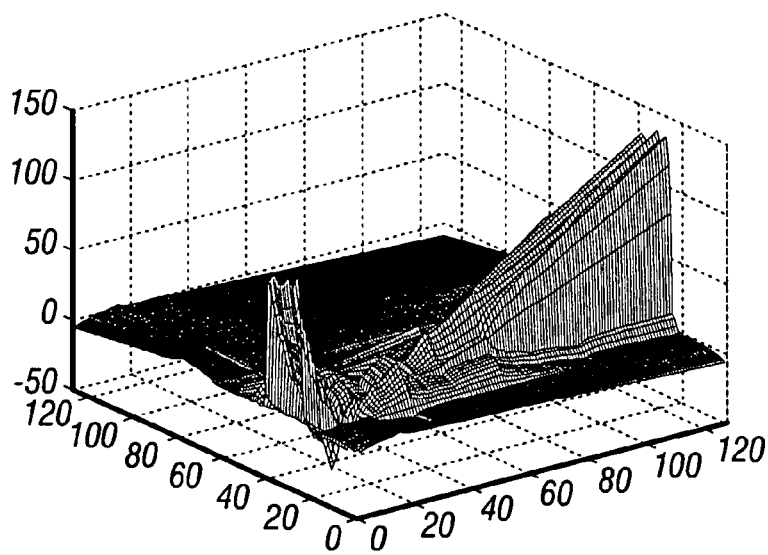

*FIG. 8*

Approximate Answer

Propalyne Result

| Longitude ▼ | Latitude ▶ | | | | | |
|---|---|---|---|---|---|---|
| 06.865 West | (All) | | | | | |
| | ☐ 2.1825 North | | | | | |
| | ☐ 25.3125 South | | | | | |
| | ☐ 33.75 North | | | | | |
| | ☐ 56.25 South | | | | | |
| | ☐ 59.0625 North | | | | | |
| | ☐ 90 South | | | | | |

| Altitude | | |
|---|---|---|
| 1000 Milibar | | 344 6781201 |
| 800 Milibars | | 369 6018054 |
| 600 Milibars | | 362 5078247 |
| 400 Milibars | | 364 5939286 |
| 300 Milibars | | 358 4168095 |
| 100 Milibars | | 298 2477671 |
| 1000 Milibar | | 256 4754751 |
| 800 Milibars | | 269 12228389 |
| 600 Milibars 9 march 2000 00.00 GMT | 269 12228369 |
| 400 Milibars 9 march 2000 00.00 GMT | 270 21778084 |
| 300 Milibars 9 march 2000 00.00 GMT | 265 61201331 |
| 100 Milibars 9 march 2000 00.00 GMT | 221 6469352 |
| 1000 Milibars 19 march 2000 00.00 GMT | 244 4287336 |
| 800 Milibars 19 march 2000 00.00 GMT | 261 9572931 |

OK    Cancel

Current Estimate

Precentage %   0.0099919650828

Response Time Limit (sec) 1.00

Resume    Exit Query

*FIG. 16B*

METHODS FOR FAST PROGRESSIVE EVALUATION OF POLYNOMIAL RANGE-SUM QUERIES ON REAL-TIME DATACUBES

CROSS-REFERENCE TO RELATED APPLICATIONS

The present application claims the benefit of priority under 35 U.S.C. §119 to provisional application Ser. No. 60/337,109, filed Dec. 4, 2001, the disclosure of which is incorporated herein by reference.

The U.S. Government has certain rights in this invention pursuant to Grant Nos. EEC-9529152 (IMSC ERC) and ITR-0082826 awarded by the National Science Foundation.

TECHNICAL FIELD

This invention relates to database systems, methods for searching and computer implementations thereof.

BACKGROUND

Aggregate queries play a fundamental role in many modern database and data mining applications. Range-sum query evaluation is one of the most basic problems of On-Line Analytical Processing (OLAP) Systems. Range aggregate queries can be used to provide database users a high level view of massive or complex datasets. These queries have been widely studied, but much of the research has focused on the evaluation of individual range queries. In many applications, whether the users are humans or data mining algorithms, range aggregate queries are issued in structured batches. Many recently proposed techniques can be used to evaluate a variety of aggregation operators from simple COUNT and SUM queries to statistics such as VARIANCE and COVARIANCE. Most of these methods attempt to provide efficient query answering at a reasonable update cost for a single aggregation operation. An interesting exception is that all second order statistical aggregation functions (including hypothesis testing, principle component analysis, and ANOVA) can be derived from SUM queries of second order polynomials in the measure attributes. These SUM queries can be supported using any proposed OLAP method. Higher order statistics can similarly be reduced to sums of higher order polynomials.

One way to support polynomial range-sums of any degree using existing OLAP techniques is to treat each independent monomial up to the required degree as a separate measure and build a new data cube for each of these. However, this requires the measure attributes to be specified when the database is populated, which results in unwieldy storage and maintenance cost for higher order polynomials.

For example, data consumers often specify a coarse partition of the domain of a data set, and request aggregate query results from each cell of this partition. This provides a data synopsis, which is used to identify interesting regions of the data domain. Users then drill-down into the interesting regions by partitioning them further and requesting aggregate query results on the new cells. The data consumer is interested in both the individual cell values that are returned and the way the query results change between neighboring cells.

Existing algorithms evaluate a batch of range aggregate queries by repeatedly applying any exact, approximate, or progressive technique designed to evaluate individual queries. While flexible, this approach has two major drawbacks: 1) I/O and computational overhead are not shared between queries; and 2) Approximate techniques designed to minimize single query error cannot control structural error in the result set. For example, it is impossible to minimize the error of the difference between neighboring cell values.

SUMMARY

Existing methods for database queries, whether based on sampling, R-trees, or multiresolution analysis, share a common strategy: answer queries quickly using a low-resolution view of the data, and progressively refine the answer while building a sharper view. The methods, systems, and computer programs provided herein are fundamentally different. The invention provides a method for optimal progressive estimates of the query, not the data. Furthermore, the progressive evaluation comes for free since the methods, systems, and computer programs are exact algorithms.

Most of the wavelet query evaluation work has focused on using wavelets to compress the underlying data, reducing the size of the problem. ProPolyne (a method of the invention) can use compressed data, but is designed to work as an exact algorithm with uncompressed data. ProPolyne produces approximate query results by compressing queries, not data.

The invention provides a method comprising processing at least one query using a wavelets algorithm to obtain a transformed query; and performing a range-sum query on a database using the transformed query to produce a proximate, progressive, and/or exact result.

The invention provides method comprising receiving at least one query comprising at least one requested attribute; processing the at least one query to obtain a summary comprising identifying a plurality of coefficients fitting the at least one desired attribute by filtering the query using one or more filters repeating the filtering until a moment condition is obtained whereupon obtaining the moment condition the query is a transformed query; generating a transformed query table comprising a plurality of wavelet coefficients (k) comprising values in descending order; performing a range-sum query in a database using wavelet coefficient (n) of the transformed query beginning with the largest, wherein the data in the database includes a plurality of attributes and are represented as a d-dimensional data cube having a plurality of cells, the dimensions of the data cube corresponding respectively to the attributes, each cell having an aggregate value of the corresponding data attribute values, the transformed query defining a subset of the dimensions of the data cube; computing a plurality of range-sums based on the values corresponding to the data attributes in the subset; and generating an exact range-sum result when n=k or an approximate or progressive result when n<k.

The invention further provides an article of manufacture, comprising a computer-readable medium; and instructions on the computer readable medium for directing a computer to: process at least one query using a wavelets algorithm to obtain a transformed query; and perform a range-sum query on a database using the transformed query to produce a proximate, progressive, and/or exact result.

The invention also provides a computer program on computer readable medium for causing a computer to: receive at least one query comprising at least one requested attribute; process the at least one query to obtain a summary comprising identifying a plurality of coefficients fitting the at least one desired attribute by filtering the query using one or more filters repeating the filtering until a moment condition is obtained whereupon obtaining the moment condition the query is a transformed query; generate a transformed query table comprising a plurality of wavelet coefficients (k) comprising values in descending order; perform a range-sum query in a database using wavelet coefficient (n) of the transformed query beginning with the largest, wherein the data in the database includes a plurality of attributes and are represented as a d-dimensional data cube having a plurality of cells, the dimensions of the data cube corresponding respectively to the attributes, each cell having an aggregate value of the corresponding data attribute values, the transformed query defining a subset of the dimensions of the data cube; compute a plurality of range-sums based on the values corresponding to the data attributes in the subset; and generate an exact range-sum result when n=k or an approximate or progressive result when n<k.

The invention provides a database system for performing a range-sum query in a database comprising: a computer readable medium comprising instructions for causing a computer to: process at least one query using a wavelets algorithm to obtain a transformed query; and perform a range-sum query on a database using the transformed query to produce a proximate, progressive, and/or exact result.

The invention further provides a database system for performing a range-sum query in a database comprising: a computer readable medium comprising instructions for causing a computer to: receive at least one query comprising at least one requested attribute; process the at least one query to obtain a summary comprising identifying a plurality of coefficients fitting the at least one desired attribute by filtering the query using one or more filters repeating the filtering until a moment condition is obtained whereupon obtaining the moment condition the query is a transformed query; generate a transformed query table comprising a plurality of wavelet coefficients (k) comprising values in descending order; perform a range-sum query in a database using wavelet coefficient (n) of the transformed query beginning with the largest, wherein the data in the database includes a plurality of attributes and are represented as a d-dimensional data cube having a plurality of cells, the dimensions of the data cube corresponding respectively to the attributes, each cell having an aggregate value of the corresponding data attribute values, the transformed query defining a subset of the dimensions of the data cube; compute a plurality of range-sums based on the values corresponding to the data attributes in the subset; and generate an exact range-sum result when n=k or an approximate or progressive result when n<k.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 7 shows the Batch-Biggest-B algorithm for progressive evaluation of batch vector queries.

FIG. 8 shows an approximation of a typical Range-Sum query function with 25 Db4 Wavelets.

DETAILED DESCRIPTION

Figure 1:
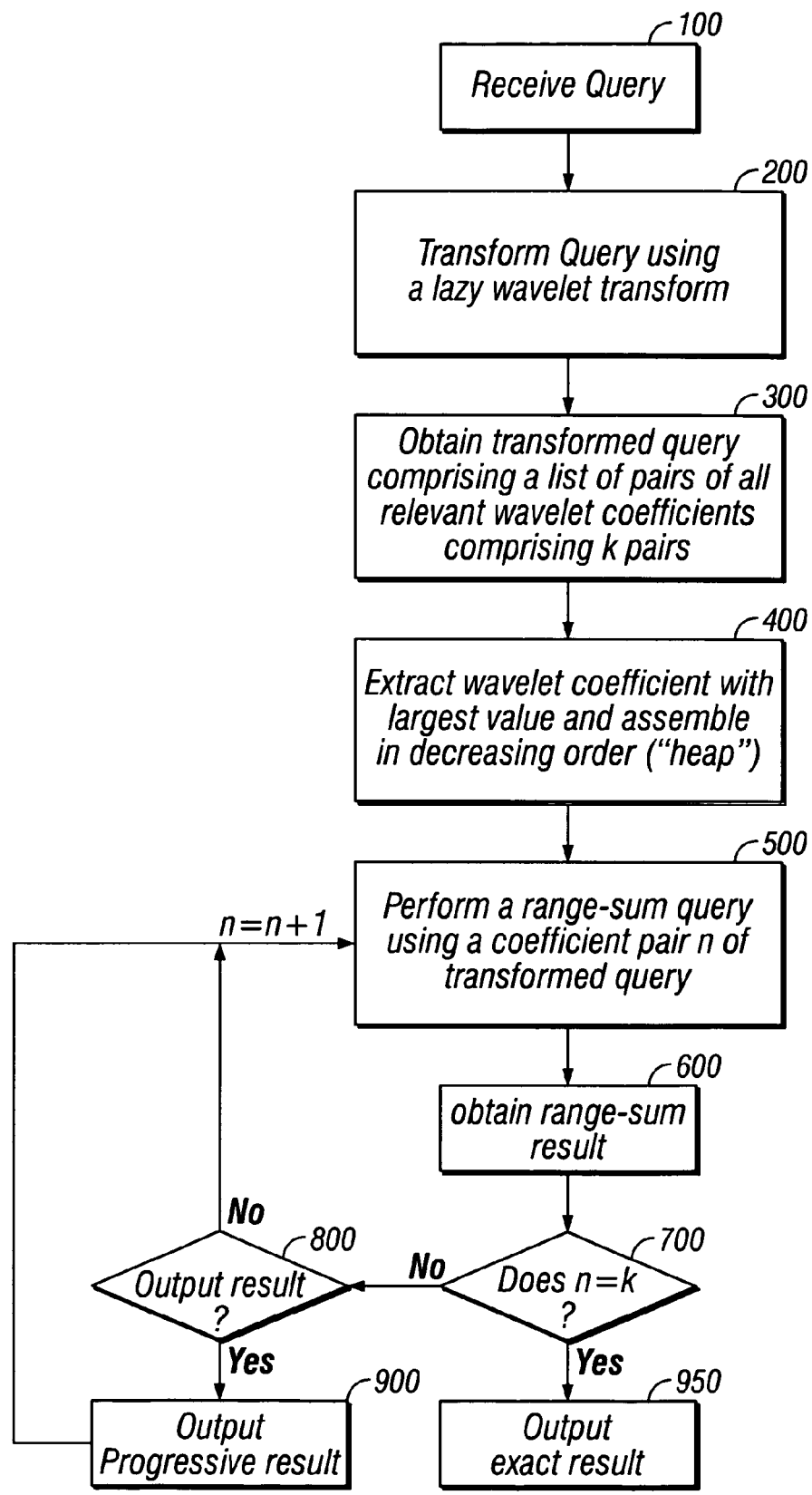
FIG. 1 shows a flow diagram depicting a method of the invention.

Processing data stored in databases over the Internet or on-line is a critical business application that allows users to analyze data present in large databases (e.g., data warehouses). The processed data can then be used as new data such as that provided by data mining applications. One type of data model for such applications is the multi-dimensional database (MDDB) (e.g., a d-dimensional database, such as a "data cube"). A data cube model is described, for example, by J. Gray et al. in "Data Cube: A Relational Aggregate Operator Generalizing Group-bys, Cross-tabs and Sub-totals," Proc. of the 12th Int'l Conf. On Data Engineering, pp. 152-159, 1996.

A d-dimensional database comprises a plurality of attributes. Each data record of the d-dimensional database contains a value for each of the data attributes. One of these attributes is chosen as an attribute of interest. The remaining attributes, d, are referred to as dimensions or functional attributes. The measure attribute values of all records with the same combination of functional attributes are combined (e.g., summed up) into an aggregate value. Thus, an MDDB can be viewed as a d-dimensional array, indexed by the values of the d functional attributes, whose cells contain the values of the measure attribute for the corresponding combination of the functional attribute values.

For example, a d-dimensional database representing data for a company may have four dimensions corresponding to the attributes of age, year, state, and employment status, respectively. Assuming that the domain of age is from 20 to 70, of year is from 1987 to 2002, of state is the 50 states in U.S., and employment status represents active, terminated, or leave, the data cube thus has 50×16×50×3 cells, with each cell containing the total salary (the attribute of interest in this example) for the corresponding combination of age, year, state, and employment status.

One typical query in d-dimensional databases involves the aggregation of a group of the cells selected from the data cube, where a value of interest for some functional attribute is specified. These are referred to as range-sum queries, and are frequently used for numeric attributes capable of ordering, such as age, time, salary, and the like. The specified ranges of the attribute domains are contiguous, and may or may not include the entire domains. For example, consider the company database above, a typical range-sum query on the database may be for finding the total salary for employees between the age of 30 to 40, in years 1990 to 1998, in all states of the U.S., and which are active employees. To answer this query, a typical algorithm sets values for "all" in the state domain. However, since the query specifies 10 different values in the age domain, and 9 different values in the year domain, one needs to access 10×9 cells in the database and sum them before returning the answer.

Attempts to optimize the speed of returning results of range-sum query has focused on building hierarchical tree structures and then storing in each internal node of the tree the total sum of all respective leaf nodes. For example, in addition to keeping the total sum over all ages for each combination of (age, year, state, status) in a record 10 separate range sums (e.g., ages 1 to 10, 11 to 20 . . . ) are kept. Thus, a range-sum query is performed by traversing the tree and adding the values at the nodes that fall within the query. As discussed above, such a method is slow.

The present invention provides a novel technique that can support any polynomial range-sum query (up to a degree specified when the database is populated) using a single set of precomputed aggregates.

This extra power comes with little extra cost: the query, update, and storage costs are comparable to the best-known MOLAP techniques (see Table 1). This technique is achieved by observing that polynomial range-sums can be translated and evaluated in the wavelet domain. When a wavelet is chosen to satisfy an appropriate moment condition, most of the query wavelet coefficients vanish making the query easier to evaluate. This technique is accomplished, in part, using a lazy wavelet transform, an algorithm that translates polynomial range-sums to the wavelet domain in poly-logarithmic time.

Transformation algorithms are used to transform the query into a concise query eliminating unnecessary coefficients to optimize the search and space required. Commonly used transformation algorithms include the Fast Fourier transform (FFT) and the discrete wavelet transform (DWT). Both FFT and DWT are linear operations that generate a data structure that contains segments of various lengths, usually filling and transforming it into a different data vector of length. The mathematical properties of the matrices involved in the transforms are similar as well. The inverse transform matrix for both the FFT and the DWT is the transpose of the original. As a result, both transforms can be viewed as a rotation in function space to a different domain. For the FFT, this new domain contains basis functions that are sines and cosines. For the wavelet transform, this new domain contains more complicated basis functions called wavelets, mother wavelets, or analyzing wavelets. Both transforms have another similarity. The basis functions are localized in frequency, making mathematical tools such as power spectra and scale grams useful at picking out frequencies and calculating power distributions.

A dissimilarity between these two kinds of transforms is that individual wavelet functions are localized in space. Fourier sine and cosine functions are not. This localization feature, along with wavelets localization of frequency, makes many functions and operators using wavelets "sparse" when transformed into the wavelet domain. This sparseness, in turn, results in a number of useful applications such as data compression.

Wavelets are often thought of as a data approximation tool, and have been used this way for approximate range query answering. The efficacy of this approach is highly data dependent; it works when the data have a concise wavelet approximation. Furthermore the wavelet approximation is difficult to maintain. To avoid these problems, the methods of the invention use wavelet algorithms to approximate incoming queries rather than the underlying data.

A discrete wavelet transform (DWT) may be implemented by a series of filtering stages each having a high-pass filter and a low-pass filter connected, for example, in parallel. Hence, an input to a filtering stage is filtered by the low-pass filter to produce one output with the low frequency components of the input. At the same time, this input is also filtered by the high-pass filter to produce another output with high frequency components. This filtering operation repeats at each stage to decompose the input.

FIG. 1 shows a flow diagram depicting a method and process of the invention. Upon receipt of a database query 100, the query is transformed 200 using an algorithm that smoothes and/or compresses the query (e.g., a lazy wavelet transform). The transform provides a transformed query comprising a list of pairs of all relevant wavelet coefficients comprising k pairs 300. The wavelet pairs are then ranked in decreasing order 400. A range-sum query is then made to the database using a coefficient pair n 500. A range-sum result is obtained for each coefficient pair 600. A progressive result and/or an exact result may be provided. At 700 a determination of whether the coefficient pair is the final pair (i.e., whether n=k). If n≠k, then a determination is made as to whether to provide a progressive result 800. A progressive result may be output at 900. Once the progressive output is made at 900, or where a progressive output is not desired 800, the method loops back to 500 to perform a range-sum query using the next coefficient pair of the transformed query.

In one aspect of the invention the wavelet algorithm is a generalization of the Haar transform that maintains many of the essential properties of the transform while providing more room for wavelet design. The invention can use wavelets arising from pairs of orthogonal convolution-decimation operators.

For example, an operator, H, computes a local average of an array at every other point to produce an array of summary coefficients. Another operator, for example, G, measures how values in the array vary inside each of the summarized blocks to compute an array of detail coefficients. For example, when filters h and g are used for an array a of length 2q the equation below is generated:

$$Ha[i] = \sum_{j=0}^{2q-1} h[(2i-j) \bmod 2q]a[j]$$

and $$Ga[i] = \sum_{j=0}^{2q-1} g[(2i-j) \bmod 2q]a[j]$$

In order to ensure that h and g act as "summary" and "detail" filters, respectively, it is provided that $\Sigma h[j] = \sqrt{2}, \Sigma g = 0, \Sigma h^2 = \Sigma g^2 = 1$, and $g[j] = (-1)^j h[1-j]$. These conditions imply that splitting an array into summaries and details preserves scalar products:

$$\sum_{j=0}^{2q-1} a[j]b[j] = \sum_{i=0}^{q-1} Ha[i]Hb[i] + \sum_{i=0}^{q-1} Ga[i]Gb[i] \quad (3)$$

A Haar wavelet summary filter h is defined by $h[0]=h[1]=1/\sqrt{2}$, and $h[i]=0$ otherwise. The Haar wavelet detail filter g has $g[0]=1\sqrt{2}$, $g[1]=-1/\sqrt{2}$, and $g[i]=0$ otherwise. The convolution-decimation operators H and G corresponding to these filters are orthogonal.

To obtain the discrete wavelet transform, this process occurs recursively, at each step splitting the summary array from the previous step into a summary of summaries array and details of summaries array. In time $\theta(N)$ the discrete wavelet transform is computed.

Given orthogonal convolution-decimation operators H and G, and an array a of length 2j, the discrete wavelet transform [DWT] of a is the array â where:

$$â[2^{j-j*}+k]=GH^{j*}a[k]$$

for $1 \leq j^* \leq j$ and $0 \leq k < 2^{j-j*}$. Define $â[0]=H^j a[0]$. The element â is the wavelet coefficients of a. The arrays $H^{j*}a$ and $GH^{j*-1}a$, respectively are the summary coefficients and detail coefficients at level $j^*$.

Accordingly, if â is the DWT of a and e' is the DWT of e then $\Sigma â[\eta]e[\eta]=\Sigma a[i]e[i]$. To define wavelet transformations on multidimensional arrays the tensor product construction is used. The construction is simple: given a library of one dimensional transforms, a multidimensional transforms is built by applying one dimensional transforms in each dimension separately.

A one dimensional DWT is linear and can be represented by a matrix $[W_{n,i}]$ such that for any array a of length $$N: â[\eta] = \sum_{i=0}^{N-1} W_{\eta,i} A[i].$$

Given the multidimensional array $a[i_0, \ldots, i_d-1]$, performing this transformation in each dimension yields the multivariate DWT of a $$â[\eta_0, \ldots, \eta_{d-1}] = \sum_{i_0, \ldots, i_{d-1}=0}^{N-1} W_{\eta_0, i_0} W_{\eta_1, i_1} \ldots W_{\eta_{d-1}, i_{d-1}} a[i_0, \ldots, i_{d-1}]$$

Using the fast wavelet transform for each of these one dimensional matrix multiplications computes the sum in $\Theta(lN^d)$ for d-dimensional data. Repeated applications of the above yields:

$$\sum_{\eta_0, \ldots, \eta_{d-1}=0}^{N-1} â[\eta_0, \ldots, \eta_{d-1}]g[\eta_0, \ldots, \eta_{d-1}] = \quad (4)$$

$$\sum_{i_0, \ldots, i_{d-1}} a[i_0, \ldots, i_{d-1}]g[i_0, \ldots, i_{d-1}]$$

Not only can a query be preprocessed, but data can also be preprocessed using the wavelet transform, stored, and accessed for query evaluation, as described above with respect of FIG. 1. This method imposes no storage cost for dense data, and increases the storage requirements by a factor of $O(\log^d n)$ in the worst case. Orthogonal wavelet filters h and g of length l are fixed.

Combining Equations $Q(R,\theta,\Delta_I)=(f\chi_R,\Delta_I)$ (2) and (4) above, and interpreting functions on Dom(F) as a d-dimensional array, a new formula for range-sums is obtained:

$$Q(R, f, \Delta) = \quad (5)$$

$$\left\langle \widehat{f\chi_R}, \hat{\Delta} \right\rangle = \sum_{\eta_0, \ldots, \eta_{d-1}=0}^{N-1} \widehat{f\chi_R}(\eta_0, \ldots, \eta_{d-1}) \hat{\Delta}(\eta_0, \ldots, \eta_{d-1})$$

This provides a technique for evaluation of range-sums with arbitrary measures entirely in the wavelet domain. Thus, given a dataset with data frequency distribution $\Delta$ the data set is processed as follows:

Prepare a [sparse] array representation of $\Delta$. This requires time proportional to |I|, the size of the dataset.

Use the multidimensional fast wavelet transform to compute the [sparse] array representation of $\hat{\Delta}$. If the data are sparse, this requires time $O(|I|l^d \log^d N)$. If the data are dense, this requires time $N^d=O(|I|)$.

Store the array representation of $\hat{\Delta}$. If the data are sparse, use a hash-index. If the data are dense, use array-based storage. In either a constant time access to any particular transform value is obtained.

For dense data, this preprocessing step introduces no storage overhead. The worst possible storage overhead arises when the dataset has only one record. $O(l^d \log^d N)$ non-zero wavelet transform values need to be stored in this case.

In order to use Equation 5 to evaluate a general range-sum with query function $f\chi_R$ using the stored wavelet transform data, a method comprises Compute the wavelet transformation $$\widehat{f\chi_R}.$$

Using the fast wavelet transform requires time $O(l \log^d N)$
Initializing sum←0.

For each entry $\bar{\eta}=(\eta_0, \ldots, \eta_{d-1})$ in the array representation of $$\widehat{f\chi_R},$$

retrieve $\hat{\Delta}(\bar{\eta})$ from storage and set sum←sum+

$$\widehat{f\chi_R}(\bar{\eta})\hat{\Delta}(\bar{\eta}).$$

For general query functions, there are $O(N^d)$ items retrieved from storage. When complete, sum is the query result.

This is a correct method for evaluating range-sum in the wavelet domain, but it is not an efficient method. Using the methods and systems described herein (see FIG. 1) it is possible to improve polynomial range-sums with respect to both the query transformation cost and the I/O cost.

In one aspect of the invention there is provided a method and algorithm for polynomial range-sums of degree less than δ in each attribute, the algorithm having a time complexity $O((l \log N)^d)$, where $l=2\delta+1$. The data structure used for storage can be updated in time $O((l \log N)^d)$. The algorithm can use preprocessed data as described herein. If the storage cost is prohibitive, it is possible to store a wavelet synopsis of the data and use this algorithm to evaluate approximate query results or use this technique for dense clusters.

As discussed, a fast algorithm for computing wavelet transforms of query functions results in transforms that are very sparse. This allows the evaluation of queries using Equation 5 above. For example, consider the problem of transforming the indicator function $\chi_R$ of the interval $R=[5,12]$ on the domain of integers from 0 to 15 using a Haar filter such as the ones described herein. Before computing the first recursive step of the wavelet transformation the following is known:

The detail coefficients are all zero unless the detail filter overlaps the boundary of $R: H\chi_R(i)-\chi_R(2i+1)-\chi_R(2i)=0$ if $i \notin \{2,6\}$.

The summary coefficients are all zero except when the summary filter overlaps $R: H\chi_R(i)=0$ when $i \notin [2,6]$.

The summary coefficients are constant when the summary filter is contained in $R: H\chi_R(i)=\sqrt{2}$ when $2<i<6$.

Without applying the operators H and G it is determined that most of the values of $H\chi_R$ and $G\chi_R$ in constant time. The only interesting points, $$2 = \left\lceil \frac{5}{2} \right\rceil \text{ and } 6 = \left\lceil \frac{12}{2} \right\rceil,$$

arise from the boundaries of R. These values can be computed in constant time such that $G\chi_R(2)=-1/\sqrt{2}$, $G\chi_R(6)=-1/\sqrt{2}$ and $H\chi_R(2)=H\chi_R(6)=1/\sqrt{2}$. In constant time, a data structure can be built containing all of the information needed to evaluate any summary or detail coefficient. This is performed at any recursive step in the Haar transform of a constant function the summary coefficients are constant on an interval, zero outside, and on two boundary points. Also, there are two nonzero detail coefficients. Each of the log N=j steps can be carried out in constant time, thereby performing the entire transform in time and space $\theta(\log N)$. Using the standard DWT algorithm would require time and space $\theta(N)$. Because there are two nonzero detail coefficients per step, the resulting transform has less than 2 log N nonzero terms. Carrying this example through $$X_n = \{0, 0, 0, 0, 0, 1, 1, 1, 1, 1, 1, 1, 1, 0, 0, 0\} \quad (6)$$

$$\tilde{X}_n = \left\{2, \frac{1}{2}, \frac{3}{2\sqrt{2}}, -\frac{3}{2\sqrt{2}}, 0, \frac{1}{2}, 0, -\frac{1}{2}, 0, 0, \frac{1}{\sqrt{2}}, 0, 0, 0, -\frac{1}{\sqrt{2}}, 0\right\}$$

When the wavelet coefficients for a data density function $\Delta$ on $[0,15]$ are stored and Equation 5 is used to evaluate $Q(R, f, \Delta)$ the values of $\hat{\Delta}$ where $$\hat{\chi}_R \neq 0$$

is retrieved. Because there are at most 2 log N of these coefficients one can evaluate the query in time $O(\log N)$.

Recognizing that the recursive step of the DWT can be made in constant time, the number of nonzero wavelet coefficients of the query function is $O(\log N)$, and with appropriate filters a lazy wavelet transformation (LWT). The LWT evaluates convolution results when they are needed at the next recursive step. This is particularly relevant when a wavelet satisfies a moment condition. A moment condition occurs when G is said to satisfy condition $M(\delta)$ if $Gx^k=0$ for $0 \leq k \leq \delta$ (i.e., $\Sigma g[i]i^k=0$ where g is the filter corresponding to the detail operator G). For example, the Db4 wavelet summary filter $h_4$ is defined by $h_4(0)=(1+\sqrt{3})/(4\sqrt{2})$, $h_4(1)=(3+\sqrt{3})/(4\sqrt{2})$, $h_4(2)=(3-\sqrt{3})/(4\sqrt{2})$, $h_4(3)=(1-\sqrt{3})/(4\sqrt{2})$, and $h_4(i)=0$ otherwise. The Db4 wavelet detail filter has $g_4(i)=(-1)^i h_4(1-i)$. The convolution-decimation operators corresponding to this pair of filters are orthogonal and satisfy $M(\delta)$. The Haar filters satisfy $M(0)$. For higher moment conditions, higher order Daubechies filters are used.

The lazy wavelet transform can the be demonstrated as follows: assuming that $f\chi_R$ is a query function for a polynomial range-sum with deg $f=\delta$ on a domain of size N, and that h and g are filters of length l generating orthogonal convolution-decimation operators that satisfy $M(\delta)$. Then the sparse representation of the wavelet transform of $f\chi_R$ with filters h and g can be computed in time $\theta(l \log N)$ and the resulting transform has at most $2(l-2)\log N$ nonzero values.

Figure 2:
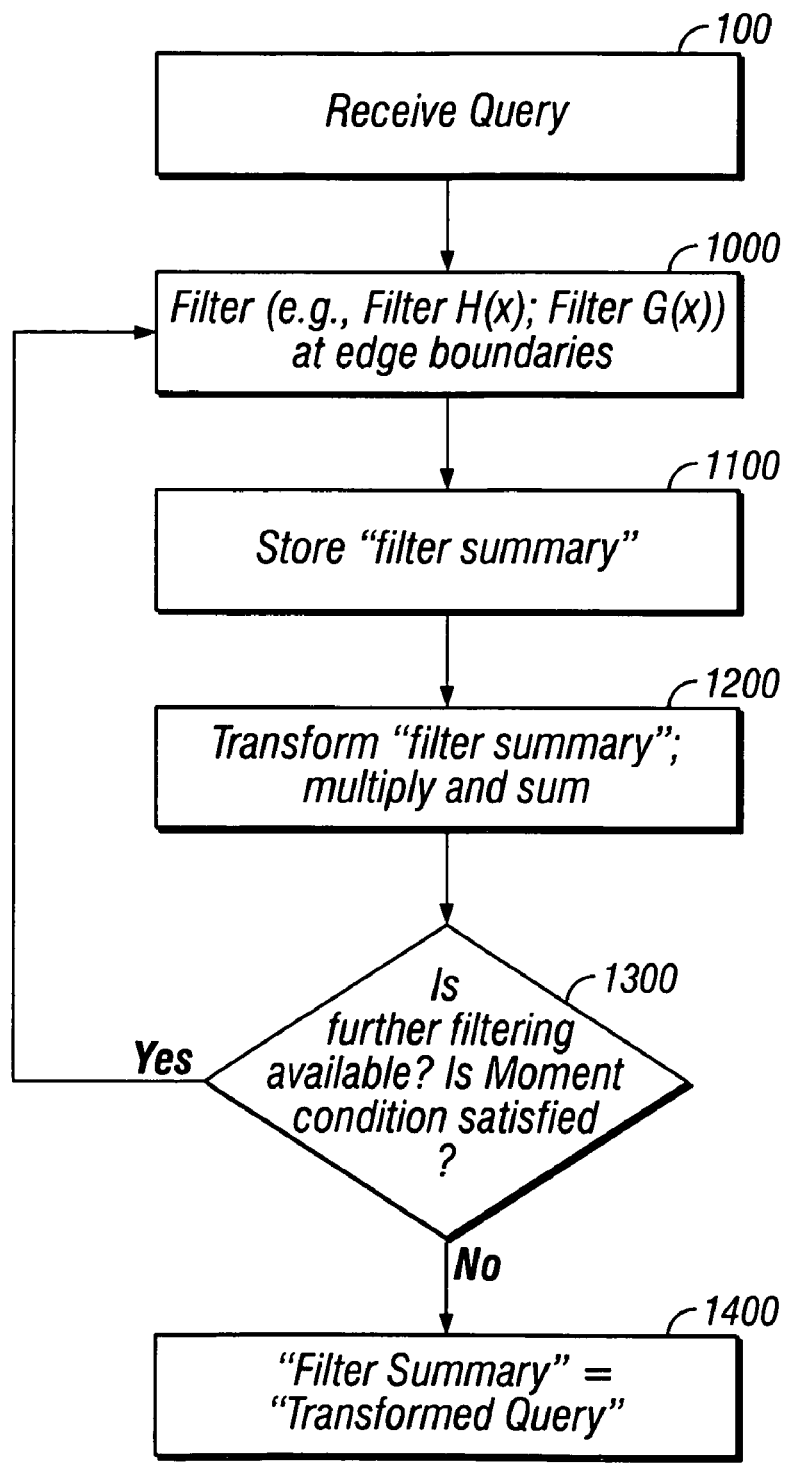
FIG. 2 is a flow chart showing a wavelet transformation process of the invention.

As stated herein, most of the wavelet coefficients for a query function do not need to be computed. With reference to FIG. 2 there is shown further detail of a transform of a query. Upon receipt of a query 100, the query is filtered using one or more filters 1000. The filters can be orthogonal filters such as h and g (as described herein). For each filter there is created a summary or detail set of coefficients (e.g., "summary query"). These summary queries are stored for later access at 1100. The summary query coefficients are then used as a transform filter summary for further filtering until a moment condition is satisfied 1300. Upon satisfying the moment condition the filter summary coefficients become the transformed query 1400. For example, where f is a polynomial of degree less than or equal to $\delta$, and the orthogonal wavelet filters h and g with filter length l satisfy $M(\delta)$ and $N=2^j$ then for the range function $f\chi_{[l,u]}$ on $[0,2^j-1]$, the summary coefficients $S(\chi,j^*)$ at level $j^* \leq 0$ are zero outside an interval $$[l^s_{j*} - l, u^s_{j*} + l]$$

and are equal to a polynomial $p_{j*}(\chi)$ of degree less than or equal to $\delta$ in the interval $$[l^s_{j*}, u^s_{j*}].$$

The values $$l^s_{j*}, u^s_{j*},$$

and the coefficients of $p_{j*}$ can be computed in time $O(\delta l)$ from the values $$l^s_{j*+1}, u^s_{j*+1},$$

and the coefficients of $p_{j*+1}$.

This is trivial for j*=0, where the summary coefficients are just the original range function, taking $$l_0^s = l \text{ and } u_0^s = h.$$

Inductively assume that the result holds for j*+1≦0. Thus, by definition, $$S(x, j_*) = \sum_{k=0}^{l-1} h_k S(2x - k, j_* + 1)$$

If $$2x < l_{j_*+1}^s - l \text{ or if } 2x > u_{j_*+1}^s + 2l - 1$$

then the induction hypothesis implies that S(x,j*) is zero. Also, if $$l_{j_*+1}^s + l - 1 \leq 2x \leq u_{j_*+1}^s \text{ then } S(x, j_*) = \sum_{k=0}^{l-1} h_k p_{j_*+1}(2x-k) \equiv p_{j_*+1}(x).$$

The coefficients of $$p_{j_*+1}(x) \equiv \sum_{k=0}^{l-1} h_k p_{j_*+1}(2x - k)$$

can be computed in time O(δl). Choosing $$l_{j_*}^s = \left\lceil \frac{l_{j_*+1}^s + l - 1}{2} \right\rceil$$

and $$u_{j_*}^s = \left\lfloor \frac{u_{j_*+1}^s}{2} \right\rfloor,$$

this holds for level j*. Notice that it may be the case that $$l_{j_*}^s \geq u_{j_*}^s,$$

giving effectively one short interval of nonzero coefficients.

Given this simple structure of the summary coefficients it is now very easy to say without computation that most of the detail coefficients are zero, and that the location of the few nonzero terms is easy to compute.

The detail coefficients of the range function above at level j*<0 are supported in two (not necessarily disjoint) intervals $$[l_{j_*}^d, l_{j_*}^d + l] \text{ and } [u_{j_*}^d, u_{j_*}^d + l]$$

where $$l_{j_*}^d = \left\lceil \frac{l_{j_*+1}^s - 2l + 2}{2} \right\rceil \text{ and } u_{j_*}^d = \left\lceil \frac{u_{j_*+1}^s - l + 2}{2} \right\rceil.$$

This is very similar to the proof above, only the moment condition for the filter G now makes the terms between $$l_j^d + l \text{ and } u_j^d$$

vanish. The fact that G is chosen to be supported on the interval [2−l, 1] also affects the bookkeeping that leads to the final form of the results.

Accordingly, each of the log N recursive steps of the wavelet transform can be carried out in time O(l) because there are only O(l) "interesting" coefficients to compute. This gives a total time complexity of O(l log N). In addition, this provides that at each of the log N resolution levels at most 2l−2 nonzero detail coefficients are added.

Daubechies' construction of compactly supported orthogonal wavelets can be used to produce wavelets satisfying M(δ) that have filter length l=2δ+2. Using these filters it is possible to transform polynomial query functions of degree less than δ in time θ(δ log N) and the result has less than (4δ+2)log N nonzero coefficients.

Using the lazy wavelet transform can dramatically speed up query evaluation in the wavelet domain. As an example a special type of polynomial range query is defined that is particularly easy to work with. A polynomial range-sum with measure function $f: Dom(F) \to R$ is said to satisfy condition S(δ) if $$f(x_0, \ldots, x_{d-1}) = \prod_{i=0}^{d-1} p_i(x_i)$$

and each $p_i$ has degree less than or equal to δ, and R is a hyper-rectangle.

Consider a table of employee ages and salaries, with entries [age, salary]: {[25, 50K], [28, 55K], [30, 58K], [50, 100K], [55, 130K], [57, 120K]}. Choose a range R to be the set of all points where 25≦age≦40 and $55000≦salary≦$150000.

By choosing $f(\bar{x}) \equiv 1(\bar{x}) = 1$ the range-sum query returns the COUNT of the tuples that lie in R:

$$Q(R, 1, I) = \sum_{\bar{x} \in R \cap I} 1(\bar{x}) = 1(28,55\ K) + 1(30,58\ K) = 2$$

Choosing $f(\bar{x}) \equiv salary(\bar{x})$ the range-sum query computes the SUM of salary for tuples in the set R:

$$Q(R, salary, I) = \sum_{\bar{x} \in R \cap I} salary(\bar{x}) = f(28,55\ K) + f(30,58\ K) = 113\ K$$

An AVERAGE query for a measure function given a range is the ratio of the SUM query with the COUNT query for that range. Taking $f(\bar{x}) \equiv salary(\bar{x}) \times age(\bar{x})$ the range-sum query computes the total product of salary and age for tuples in the set R:

$$Q(R, salary \times age, I) = \sum_{\bar{x} \in R \cap I} salary(\bar{x}) \times age(\bar{x}) = f(28,55K) + f30,58K\Big) =$$

3280M

This is a component for the computation of covariance in the range R. In particular:

$$Cov(\text{age, salary}) = \frac{Q(R, \text{salary} \times \text{age}, I)}{Q(R, 1, I)} - \frac{Q(R, \text{age}, I)Q(R, \text{salary}, I)}{(Q(R, 1, I))^2}$$

The variance, kurtosis, or any other statistics in a range can be computed similarly.

All of the above examples satisfy the polynomial range-sum above wherein the measure function $f: \text{Dom}(F) \to R$ is said to satisfy condition $S(\delta)$ if $$f(x_0, \ldots, x_{d-1}) = \prod_{i=0}^{d-1} p_i(x_i)$$

and each $p_i$ has degree less than or equal to $\delta$, and R is a hyper-rectangle: COUNT satisfies $S(0)$, SUM, AVERAGE, and COVARIANCE are computed with range-sums satisfying $S(2)$, and VARIANCE is computed with range-sums satisfying $S(2)$. As the example above makes clear, the class of polynomial range-sums is rich, even restricted to satisfy condition $S(\delta)$.

Consider a polynomial range-sum with query function $$f\chi_R = \prod_{j=0}^{d-1} p_j(i_j)\chi_{R_j}(i_j).$$

By Equation $$4\widehat{f\chi_R} = \widehat{\prod p_j \chi_{R_j}} = \prod \widehat{p_j \chi_{R_j}}.$$

If $f\chi_R$ satisfies $S(\delta)$, then using Daubechies' filters of length $2\delta+2$, a data structure representing $$\widehat{f\chi_R}$$

can be computed in time $\theta(d\delta \log N)$, and $$\widehat{f\chi_R}$$

has $O((4\delta+2)^d \log^d N)$ nonzero coefficients. Thus the following query evaluation technique is provided for queries satisfying $S(\delta)$. General multivariate polynomials of degree $\delta$ can always be split into a sum of polynomials satisfying $S(\delta)$, each of which is transformed separately.

Thus a Fast Wavelet Query Evaluation includes using the lazy wavelet transform to compute the d one-dimensional wavelet transforms $$\widehat{p_j \chi_{R_j}}.$$

Initialize sum$\leftarrow 0$. Iterate over the Cartesian product of the nonzero coefficients of the $$\widehat{p_j \chi_{R_j}}.$$

For each $\overline{\eta}=(\eta_0, \ldots, \eta_{d-1})$ in this set, retrieve $\hat{\Delta}(\overline{\eta})$ from storage and set $$\text{sum} \leftarrow \text{sum} + \hat{\Delta}(\overline{\eta}) \prod \widehat{p_j \chi_{R_j}}(\eta_j).$$

When complete, sum is the query result.

This algorithm is dominated by the I/O phase of the iteration over the Cartesian product above $d>1$. The online preprocessing phase takes time and space $\theta(d\delta \log N)$.

The lazy wavelet transform also provides for fast updates of the database. To insert a record $\overline{i}=i_0, \ldots, i_{d-1})$ let $\chi_{\overline{i}}$ denote the function equal to 1 at $\overline{i}$ and zero elsewhere. Then the updated data frequency distribution is $\Delta_{new} = \Delta + \chi_{\overline{i}}$.

The linearity of the wavelet transform provides $$\hat{\Delta}_{new} = \hat{\Delta} + \hat{\chi}_{\overline{i}}.$$

Thus to perform an update, $\hat{\chi}_{\overline{i}}$ is computed and the result added to storage. Furthermore, $\chi_{\overline{i}}$ can be thought of as a query function satisfying $S(0)$ such that it is transformed just as the other query functions were transformed. A careful look reveals that in this case the "interesting intervals" overlap completely, and $\hat{\chi}_{\overline{i}}$ can be computed in time $\theta((2\delta+1)^d \log^d N)$.

To insert $\overline{i}=(i_0, \ldots, i_{d-1})$ use the lazy wavelet transform to compute $\hat{\chi}_{i_j}$ for $0 \leq j < d$. For each $\overline{\eta}=(\eta_0, \ldots, \eta_{d-1})$ in the Cartesian product of the nonzero entries of $\chi_{i_j}$, set $\hat{\Delta}(\overline{\eta}) \leftarrow \hat{\Delta}(\overline{\eta}) + \pi \hat{\chi}_{i_j}(\eta_j)$. For hash table access, this may require an insertion.

Using Daubechies' wavelets with filter length $2\delta+2$, the Wavelet Preprocessing strategy to store data, Wavelet Update to insert new records, and Fast Wavelet Query Evaluation to evaluate queries it is possible to evaluate any polynomial range-sum satisfying $S(\delta)$ in time $O((4\delta+2)^d \log^d N)$. It is possible to insert one record in time $O((2\delta+1)^d \log^d N)$.

In Equation 6, above, some of the coefficients are larger than others. For larger ranges and higher dimensions most of the information is contained in a handful of coefficients. Thus, using the largest coefficients first an accurate estimate of the query result, before the computation, is complete.

A progressive evaluation plan for a sum $S=$ $$\sum_{0 \leq i < N} a[i]$$

is a permutation $\sigma$ of the integers 0 to N−1. The estimate of S at the $j^{th}$ progressive step of this plan is $$\sum_{0 \leq i \leq j} a[\sigma(i)].$$

When evaluating range aggregate queries using Equation 5, a data independent progressive evaluation plan for a sum of the form $$\sum \widehat{f \chi_R}(i)\hat{\Delta}(i)$$

is chosen. Let $Q'_1(\Delta)$ and $Q'_2(\Delta)$ be approximations of the query $Q(R,f,\Delta)$. $Q'_1$ dominates $Q'_2$ if $$E_\Delta[Q'_1(\Delta) - Q(R, f, \Delta))^2] \le E_\Delta[Q'_2(\Delta) - Q(R, f, \Delta))^2]$$

where $\Delta$ is randomly selected from the set $\{\Delta\Sigma\Delta^2(i)=1|\}$. A progressive query plan dominates another if the estimate of the first plan dominates the estimate of the second at every progressive step.

The invention provides a progressive evaluation plan that dominates all others. It is not obvious that this is possible, but the following result shows that the 'biggest coefficient' plan suggested herein does in fact provide a useful progressive evaluation plan.

For example, when y is a vector randomly selected from the set $$\left\{ y \left| \sum_{i=0}^{N-1} y_i^2 = 1 \right. \right\}$$

with uniform distribution, and $I \subset [0,N-1]$ is a set of size B, and for a vector x, $\tilde{x}_I$ denotes x with all coordinates except those in I set to zero; and wherein the set of the B biggest (largest magnitude) coordinates of x by I*. Then for any choice of I:

$$E_y[(x-\bar{x}_{I^*},y)^2] \le E_y[(x-\bar{x}_I,y)^2]$$

In other words, approximating x with its biggest B terms gives the best B term approximation of $\langle x,y \rangle$—an approximation that dominates all others.

Thus, for any I, $$y-\langle x-\tilde{x}_I, y\rangle = \sum_{i,j \notin I} y_i(x_i x_j)y_j = y^T R y$$

where $$R = \tilde{x}_I^T \tilde{x}_I$$

is a symmetric matrix. The average error can be obtained by integrating over the sphere of all y's $$E_y[(x-\tilde{x}_I, y)^2] = \int_{S^{N-1}} y^T R y = \int_{S^{N-1}} y^T D y = \sum \lambda_i \int_{S^{N-1}} y_i^2 = \frac{1}{n}\text{trace}(R)$$

where D is the diagonalization of R and $\lambda_i$ are the eigen values. This chain of equalities is possible because R is symmetric, hence is diagonalized by a unitary transformation that preserves the uniform distribution. But the trace of R is just the sum of squares of the coordinates of $\tilde{x}_I$, so $$E_y[(x-\tilde{x}_I, y)^2] = \frac{1}{n}\sum_{i \notin I} x_i^2,$$

which is clearly minimized by taking I=I*.

The progressive query plan obtained by using the largest query coefficients first dominates all other plans. This evaluation plan is a foundation for the progressive algorithm provided herein (sometimes referred to as ProPolyne. For example, after B progressive steps the algorithm of the invention provides the best-B wavelet approximation of a query ("query Best B ProPolyne"). This progressive query plan is implemented by first evaluating the query function transformation using the lazy wavelet transform, above, then building a heap from the resulting set of nonzero wavelet coefficients. Compute the sum repeatedly extracting the top element from this heap—the partial sums provide accurate progressive query estimates. As described further herein, this analytical framework also provides efficiently computable guaranteed error bounds at each progressive step.

Previous uses of wavelets for approximate query evaluation have focused on approximation, using wavelets to produce a precomputed synopsis data structure. One of skill in the art will note that the role of the data and the query in the results above were entirely symmetric. When "the biggest-B approximation of a query is the best-B approximation for random data", it can also be stated "the biggest-B approximation of the data is the best-B approximation for random queries". Hence a different sort of progressive query evaluation is obtained by sorting the data wavelet coefficients offline, then retrieving them in decreasing order of magnitude. This is the spirit of the approximate query evaluation algorithms, where it is shown that this gives reasonable estimates quickly. The technique presented here has the extra benefit of treating measure dimensions symmetrically, supporting general polynomial range-sums. This is sometimes referred to herein as "data best-B ProPolyne".

Query workloads, however, are far from being randomly distributed on the unit sphere. In practice, the best ordering would be weighted by the expected query workload. In any case, this technique works well if the data are well approximated by the chosen wavelets. This stands in contrast to query best-B ProPolyne, where the query functions are always well approximated by wavelets.

In practice, there are situations where the measures and aggregate functions are known at the time the database is built. When this is the case, ProPolyne can be optimized. In particular, it can be adapted to operate on the wavelet transform of the measure function rather than the frequency distribution. This adaptation is referred to herein as a fixed measure ProPolyne, or ProPolyne-FM. One notable optimization that ProPolyne-FM allows is the use of Haar wavelets in all dimensions. The fact that one-dimensional Haar wavelets do not overlap brings query evaluation cost down to $(2j)^{d-1}$ and update cost to $j^{d-1}$ for a table with d-1 j-bit attribute and one measure attribute. The cost is identical to that of the Space-efficient Dynamic Data Cube (Reiedewald et al., DaWaK, pp. 24-33, 2000). ProPolyne-FM serves another useful role: it solves the same problem as other pre-aggregation methods, so it is directly comparable.

The process of turning ProPolyne-FM into a data or query best-B progressive algorithm is identical to the process for unrestricted ProPolyne. It happens that when using Haar wavelets, the data best-B version of ProPolyne-FM is simply a progressive implementation of a compact data cube. The query best-B version of ProPolyne-FM is novel, and that approximate results it produces are significantly more accurate than those produced by the compact data cube.

An important component of any approximation technique is its ability to provide meaningful information about the distribution of errors. A family of analytic absolute bounds for the error of estimates can be made using the algorithms as set forth herein. These bounds can be maintained efficiently and made available throughout progressive query evaluation.

Propolyne evaluates queries by selecting the most important wavelets for the query and evaluating Equation 5 using these terms first. The error resulting from using only the best B coefficient is straightforward, if not efficient, to compute: simply compute the scalar product using the least important $2^j-B$ coefficients. A tractable bound on this value is produced by using Holder's inequality in each resolution level. Specifically, if $\Xi B$ denotes the set of indices of the most important B wavelets, $\overline{Q}_B(R,f,\Delta)$ is the approximate range sum obtained using only wavelets in $\Xi B$ and $\Lambda$ denotes the set f wavelet resolution levels, then the following error bound:

$$|Q(R, f, \Delta) - \tilde{Q}_N(R, f, \Delta)| \leq \qquad (7)$$

$$\sum_{\lambda \in A} \left[ \sum_{\eta \in \lambda \setminus \Xi_R} |f\hat{\chi}_R(\eta)|^{p_\lambda} \right]^{1/p_\lambda} \left[ \sum_{\eta \in \lambda \setminus \Xi_R} |\hat{\Delta}(\eta)|^{p_\lambda/(p_\lambda-1)} \right]^{(p_\lambda-1)/p_\lambda}$$

where $1 \leq p_\lambda \leq \infty$. It is possible to achieve most of the benefit of the bound in Equation 7 more cheaply by identifying a small set of resolution levels that contain most of the energy for the data density distribution or for an expected query workload. All other resolution levels are grouped into one large level and estimate (7) is maintained for the reduced set.

Based in part on the foregoing another aspect of the invention includes methods and systems for processing multiple range-sum queries. Decision support system users typically submit batches of range-sum queries simultaneously rather than issuing individual, unrelated queries. The invention provides a wavelet based technique that exploits I/O sharing across a query batch to evaluate the set of queries progressively and efficiently. The invention provides:

Batch-Biggest-B, an exact wavelet-based query evaluation strategy that exploits I/O sharing to provide fast exact query results using a data structure that can be updated efficiently;

The introduction of structural error for batch queries, and the definition of structural error penalty functions. This generalizes common error measures such as sum of square errors (SSE) and $L^p$ norms; and A progressive version of Batch-Biggest-B that can accept any penalty function specified at query time, and will minimize the worst case and average penalty at ach step of the computation.

To illustrate the applicability of the methods and systems of the invention a database of instance D of a schema F with d numeric attributes ranging from zero to N−1 is used. For example, using a multi-dimensional array of real numbers, or functions, indexed by the domain of F, Dom(F), the set of such functions is a vector space with a natural inner product, $$\langle a, b \rangle = \sum_{x \in Dom(F)} a[x]b[x]$$

for any two arrays a and b. For any set $R \subset Dom(f), \chi_R$ denotes the characteristic function of $R: \chi_R[x]=1$ if $x \in R$ and is zero otherwise.

Using a data frequency distribution to represent a database as a vector. This is a vector A indexed by Dom(F); for any tuple $x=(x_0, \ldots, x_{d-1}) \in Dom(F)$, thus $\Delta(x)$ is the number of times x occurs in D. The wavelet transform of a multidimensional array is denoted as a[x] by $\hat{a}[\xi]$. Because the wavelet transform is invertible, the wavelet transform of the data frequency distribution, $\hat{\Delta}[\xi]$ can be used to evaluate any query on the database D.

One can think of $\hat{\Delta}$ as a materialized view of D. For simplicity, a simple I/O cost model is adopted, even though there are many ways to store and access this view. Assuming that $\hat{\Delta}$ are held in either array-based or hash-based storage that allows constant-time access to any single value. The possibility that several useful values may be allocated on the same disk block is ignored, and hence retrieved for free. Similarly, the potential savings arising from intelligent buffer management is also ignored.

The technique provided herein for sharing of wavelet information on batch queries is based on the ProPolyne technique for the progressive evaluation of single polynomial range-sum queries, and reuses much of its machinery.

Given a rectangular range $R \subset Dom(F)$, the range COUNT query COUNT $(R,D) = |\sigma_R D|$ simply counts the number of tuples in D that fall in R. Recalling that $\Delta$ denotes the data frequency distribution of D, provides $$COUNT(R, D) = \sum_{x \in R} \Delta[x] = \sum_{x \in Dom(F)} \chi_R[x]\Delta[x]$$

In other words, the COUNT query is just the inner product of a (simple) query vector with an (arbitrarily complex) data vector. The Haar wavelets are orthogonal, so the Haar transform preserves inner products. Thus, $$COUNT(R, D) = \sum_{\xi \in Do\hat{m}(F)} \hat{\chi}_R[\xi]\hat{\Delta}[\xi] \qquad (1)$$

giving a formula for query evaluation in the wavelet domain. The functions $\chi_R$ are very simple, and it has been shown that $\hat{\chi}_R$ has at most $O(2^d \log^d N)$ nonzero coefficients, and they can be computed quickly. Thus Equation (1) (immediately above) can be used to evaluate COUNT queries in time $O(2^d \log^d N)$. When storing an entire relation in the wavelet basis, a new tuple can be inserted in time $O(\log^d N)$, making this method competitive with the best known pre-aggregation techniques.

Wavelets have been used successfully for data approximation, and are often thought of as a lossy compression tool. While this approach works to provide an approximate query answering scheme on some datasets, there is no reason to expect a general relation to have a good wavelet approximation. Instead this embodiment suggests using wavelets for query approximation. In particular, when evaluating the sum in Equation (1) (above) the terms where $\hat{\chi}_R$ is largest is added first, expecting the smaller terms to contribute less to the final outcome. At each step, the partial sum that was computed is just the inner product of the data vector with an approximate query vector. Experimental results have shown that this particular evaluation order provides accurate, data-independent progressive estimates in practice. As a consequence of this evaluation order stands on firm theoretical ground: at each step it minimizes the average error over random data vectors, and it minimizes the maximum possible error.

Now consider the problem of simultaneously evaluating a batch of COUNT queries for ranges $R_0, \ldots R_{s-1}$ progressively, minimizing SSE at each step. Assuming that the transformed data vector $\hat{\Delta}$ in a data structure is computed and stored such that it allows constant time access to any value. One simple solution is to use s instances of the single query evaluation technique, and advance them in a round-robin fashion. This turns out to waste a tremendous amount of I/O, since many data wavelet coefficients will be needed for more than one query. This also ignores the fact that some wavelet coefficients may not be tremendously important for any particular query, but are important for the batch as a whole.

Both of these problems are addressed by introducing a simple I/O sharing technique and showing how it can be adapted to evaluate queries progressively. For each range $R_i$, compute the list of nonzero wavelet coefficients of $\chi_R$, merge these lists into a master list, then iterate over this master list, retrieving each needed data coefficient from storage, and using it to advance the computation of each query that needs it. The I/O savings from this technique can be considerable in practice. For example, a batch of 512 range queries covering 15.7 million records in a database of temperature observations can be performed efficiently. Using multiple instances of the single query evaluation technique required 923,076 retrievals. Using this I/O sharing technique, all 512 queries were evaluated exactly after 57,456 retrievals. Note that this requires all of the nonzero wavelet coefficients of the query function to be in main memory, but there are relatively few of these when compared to the number of nonzero wavelet coefficients of the data vector. Range-sum queries have very sparse wavelet representations, and this is independent of the underlying database. Nevertheless, it is of practical interest to avoid simultaneous materialization of all of the query coefficients and reduce workspace requirements.

To evaluate queries progressively, a heap from the master list is built that orders wavelets by their "importance" for the query. Instead of iterating over the master list, the most important element from this heap is repeatedly extracted to retrieve the corresponding data wavelet coefficient from storage, and use it to advance each of the individual queries in the batch.

Figure 3:
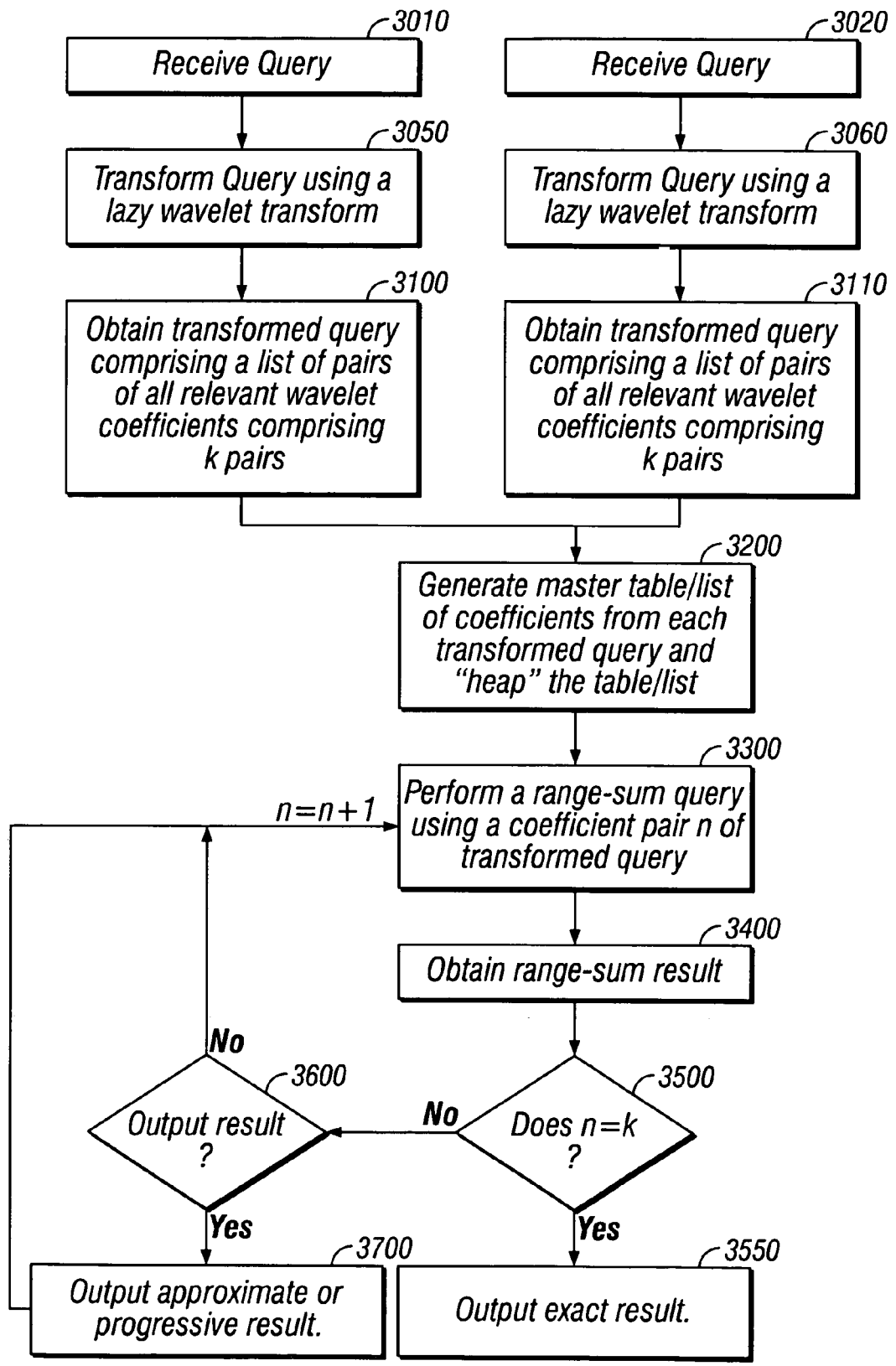
FIG. 3 is a flow chart of multiple query processing.

FIG. 3 is a flow diagram depicting a high-level process of the invention involving multiple (here two) range-sum queries. Upon receipt of a database query 3010 and 3020, each query is transformed 3050 and 3060 using an algorithm that smoothes and/or compresses the query (e.g., a lazy wavelet transform). The transform provides a transformed query comprising a list of pairs of all relevant wavelet coefficients comprising k pairs 3100 and 3110. A master heap list is then generated ranking the coefficients by value and/or importance based upon their presence in both of the queries 3200. A range-sum query is then made to the database using a coefficient pair n 3300. A range-sum result is obtained for each coefficient pair 3400. A progressive result and/or an exact result may be provided. At 3500 a determination of whether the coefficient pair is the final pair (i.e., whether n=k) is made. If n≠k, then a determination is made as to whether to provide an approximate or progressive result 3600. A progressive or approximate result may be output at 3700. Once an approximate or progressive output is made at 3700, or where an approximate or progressive output is not desired 3600, the method loops back to 3300 to perform a range-sum query using the next coefficient pair of the transformed query.

Because the goal is to control SSE, the importance of a wavelet $\xi'$ is the worst case error that arises from not retrieving $\hat{\Delta}[\xi']$ on a database $\Sigma|\hat{\Delta}[\xi]|=1$. This worst case will occur when the entire data vector is concentrated at $\xi'$, and $|\hat{\Delta}[\xi']|=1$. In this situation, $$SSE = \sum_{i=0}^{x-1} |\hat{\chi}_{R_i}[\xi']|^2 \overset{def}{=} \iota(\xi')$$

ignoring $\xi'$ leads to an SSE of which is the definition of the importance function of $\xi'$. This definition is intuitive—wavelets that are irrelevant for the batch of queries have zero importance, wavelets that have significant coefficients for many queries will have high importance.

This importance function is used to define Batch-Biggest-B, a progressive query evaluation strategy comprising:
Preprocessing: compute the wavelet transform of the data density function and store with reasonable random-access cost.
Impute: a batch of rang-sum queries and an importance function.
For each query in the batch, initialize its progressive estimate to be zero.
Compute the wavelet transform of each query in the batch, and construct a list of its nonzero wavelet coefficients
Merge these list into a master list.
Compute the importance of each wavelet in the master list, and build a max-heap from the set.
Extract the maximum element from the heap, retrieve the corresponding data wavelet coefficients, and use it to increment the progressive estimate of each query in the batch according to Equation (2) above. Repeat until heap is empty.

Because it evaluates queries by retrieving the B coefficients with highest importance before retrieving the $(B+1)^{th}$ coefficient, this is referred to as biggest-B strategy. Once size is defined correctly, biggest is in fact best.

The strategy outlined above works for much more general queries. The critical feature COUNT queries is that they are vector queries: the result is the scalar product of a query vector with a data vector. Consider the following range aggregate queries for a fixed range $R \subset Dom(F)$ and how they can be recast as vector queries:

1. COUNT queries $$COUNT(R, D) = \sum_{x \in R} \Delta[x]$$
$$= \sum_{Dom(F)} \chi_R[x]\Delta[x]$$
$$= \langle \chi_R, \Delta \rangle$$

2. SUM queries $$SUM(R, Attribute_i, D) = \sum_{x \in R} x_i \Delta[x]$$
$$= \sum_{Dom(F)} x_i \chi_R[x]\Delta[x]$$
$$= \langle x_i \chi_R, \Delta \rangle$$

-continued

3. Sums of products $$SUMPRODUCT(R, Attribute_i, Attribute_j, D) = \sum_{Dom(F)} x_i x_j \chi_R[x]\Delta[x]$$
$$= \langle x_i x_j \chi_R, \Delta \rangle \quad (5)$$

Many other aggregate query results can be derived from vector queries. The three vector queries above can be used to compute AVERAGE and VARIANCE of any attribute, as well as the COVARIANCE between any two attributes. For example, it is possible to perform principal component analysis, ANOVA, hypothesis testing, linear regression, and much more.

Using the following definitions and equation, the invention demonstrates that polynomial range-sums can be evaluated progressively and quickly. A polynomial range-sum of degree $\delta$ is a vector query of the form $q[x]=p(x)\chi_R(x)$ where p is a polynomial in the attributes of F, and R is a hyper-rectangle in Dom(F), and p has degree at most $\delta$ in any variable.

All vector queries can be evaluated in the wavelet domain just as COUNT queries are evaluated. In particular, for any vector query q and basis of orthogonal wavelets can be written $$(q,\Delta)=\Sigma \hat{q}[\xi]\hat{\Delta}[\xi]=(\hat{q},\hat{\Delta}) \quad (2)$$

This equation can be used to evaluate polynomial range-sums progressively and quickly.

Polynomial range-sum queries can be evaluated progressively almost exactly as above, the key difference being that one no longer uses Haar wavelets and achieve results efficiently. However, Equation 2 (immediately above) holds for any orthogonal wavelets. It has been shown that using Daubechies wavelets with filter length $2\delta+2$, any polynomial range-sum of degree less than or equal to $\delta$ will have less than $((4\delta+2)^d \log^d N)$ nonzero wavelet coefficients. These coefficients can be computed in time $O((4\delta+2)^d \log^d N)$. Once the data vector has been transformed and stored, new tuples can be inserted in time $O((2\delta+1)^d \log^d N)$. Thus Equation (2) (immediately above) can be used as the basis for an exact polynomial range-sum evaluation strategy that has poly-logarithmic query and update cost. Compare these costs with those for COUNT queries where $\delta=0$.

As with COUNT queries, polynomial range-sums are approximated very well by a small number of wavelets. To illustrate this, FIGS. 7-9 display the progressive approximation of a typical degree one polynomial range-sum query vector, $q[x_1,x_2]=x_1\chi_R[x_1,x_2]$ where $R=\{(25 \leq x_2 \leq 40) \wedge (55 \leq x_1 \leq 128)\}$. This query function could arise when requesting the total salary paid to employees between age 25 and 40, who make at least 55K per year. FIG. 7 displays an approximation using 25 Db4 wavelets. Note that it captures the basic size and shape of the function, but the range boundaries are inexact, and there is some spillover due to the fact that periodic wavelets were used. FIG. 8 displays an approximation using 150 wavelets. Here the range boundaries are much sharper, and the periodic spillover smaller. The most striking feature is a Gibbs phenomenon near the range boundaries. Finally, FIG. 9 displays the query function reconstructed exactly using 837 wavelets.

Now considering the problem of simultaneously evaluating a batch of polynomial range-sums $p_i[x]\chi_{R_i}[x], i \in [0,s-1]$. Notice that the definition of the importance function z did not depend on the fact that Haar wavelets were used. It only depends on the penalty function, SSE. By the same arguments, the importance of a wavelet $\xi$ can be defined by $$\iota(\xi) = \sum_{i=0}^{s-1} |p_i \hat{\chi}_{R_i}(\xi)|^2$$

and use the algorithm Batch-Biggest-B to evaluate the queries progressively.

This gives the best progressive evaluation strategy for controlling SSE. The experimental results below show that this technique produces very accurate answers after retrieving a small number of wavelet coefficients from the database.

Users submit a batch of queries because they are looking for interesting relationships between different query results. Some users may be looking for temporal trends or dramatic jumps. Others may be looking for local maxima. It is often the case that not all of the query results are used at once (e.g., they do not all fit on the screen), and the user is only interested in results that are "near the cursor". In all of these cases, the user is interested in the structure of the query results. If the query results are approximate, the user is concerned with the structure of the error. Errors that impede the task at hand should be penalized, those that are irrelevant should be tolerated if this improves efficiency. Thus, the invention further provides several specific examples of structural error penalty functions, along with formal definitions.

Consider the following scenario. Working with a database of global temperature observations, wherein the user has partitioned the latitude, longitude and time dimensions into ranges to submit a query in order to find:

Q1: Ranges with the highest average temperatures, or

Q2: An accurate view of a set of high-priority items currently in use, and a reasonable sketch of the other results, or Q3: Any ranges that are local minima, with average temperature below that of any neighboring range.

An exact result set can be used to provide any of this information, but an approximate result set that works well for one problem may work poorly for another. For example, if each query cell is approximated with no more than 20% relative error, it is possible to do a reasonable job answering Q1, but cannot be trusted to provide meaningful answers for Q3. This intuition is captured by introducing structural error penalty functions.

A structural error penalty function is a non-negative homogeneous convex function p on error vectors with the property that $p(0)=0$ and $p(-x)=p(x)\$$. As a special case, a quadratic structural error penalty function is a positive semi-definite Hermitian quadratic form on error vectors, $p(\epsilon)=\Sigma P_{ij\epsilon i \epsilon j}$.

This definition includes many well known metrics, including $L^p$ norms and Sobolev norms. It is important to allow the quadratic form to be semi-definite, as it provides the flexibility to say that some errors are irrelevant. Now revisit queries (Q1-Q3) above to see how each one implies a different quadratic penalty function. To simplify the discussion, assume that the data are dense, so AVERAGE queries reduce to weighted SUM queries.

P1: Minimize the sum of square errors, $p(\epsilon)=\Sigma |\epsilon[i]|^2$, to allow the user to accurately identify any ranges with a high average temperature.

P2: Minimize a cursored sum of square errors that makes the high-priority cells (say) 10 times more important than the other cells to produce very accurate answers for the high-priority cells, while still substantially penalizing large errors for the remaining cells.

$$p(\varepsilon) = 10\sum_{i \in H} |\varepsilon[i]|^2 + \sum_{i \notin H} |\varepsilon[i]|^2$$

where H is the set of high-priority ranges.

P3: Minimize the sum of square errors in the discrete Laplacian to penalize any false local extrema.

Linear combinations of quadratic penalty functions are still quadratic penalty functions, allowing them to be mixed arbitrarily to suit the needs of a particular problem.

An approximate batch query answering technique should aim to minimize an appropriate structural error penalty function. It is impossible to do this on a query-by query basis with a pre-computed synopsis of the data. A precomputed synopsis must be "tuned" to a particular penalty function and a particular query workload. As demonstrated, below, using an online approximation of the query batch leads to a much more flexible scheme. The invention provides a query approximation strategy which finds the "best" query approximation for any penalty function and restriction on the number of records to be retrieved from secondary storage.

One crucial point about the biggest-B progressive query evaluation strategies is that the importance function only depends on the penalty function. In fact, SSE is a quadratic penalty function, $p_{SSE}(\varepsilon) = \Sigma_i^2$. Using this notation, the importance function used to control SSE was just $l(\xi) = p_{SSE}(\hat{q}_0[\varepsilon], \ldots, \hat{q}_{s-1}[\varepsilon])$ where $q_i$ are the query vectors for a batch of s queries. In other words, $l(\xi)$ is the penalty of the vector $((\hat{q}_o[\varepsilon], \ldots, \hat{q}_{s-1}[\varepsilon]))$. This definition can be used for any penalty function:

For a penalty function p the p-weighted biggest-B approximation of a batch of queries $q_0, \ldots, q_{s-1}$ is the progressive estimate given by Batch-Biggest-B after B steps using the importance function $$l_p(\varepsilon) \stackrel{def}{=} p(\hat{q}_0[\varepsilon], \ldots, \hat{q}_{s-1}[\varepsilon]).$$

Figure 9:
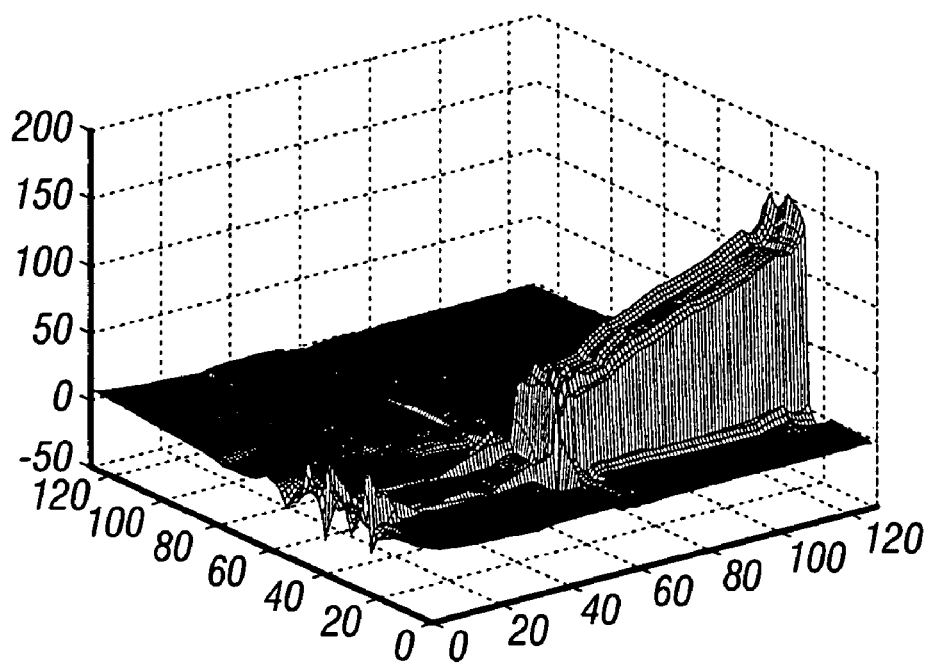
FIG. 9 shows an approximation of a typical Range-Sum query function with 150 Db4 Wavelets.
Figure 10:
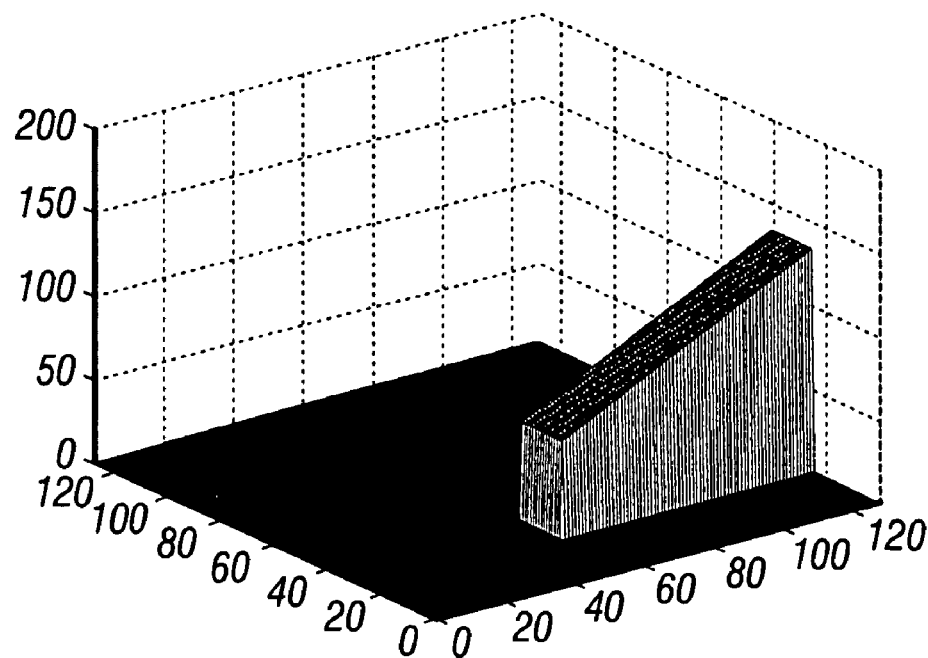
FIG. 10 shows a query function for typical Range-Sum (computed Exactly using 837 Db4 Wavelets).

For example, FIG. 9 shows the query vector for the SSE-weighted biggest-150 approximation of the query vector depicted in FIG. 10. Having defined the strategy used, the definition of the competition is provided:

A B-term approximation of a batch of vector queries $q_0, \ldots, q_{s-1}$ is an approximation of the batch of queries using only B data wavelet coefficients. That is, given some set $\Xi$ of wavelets with $|\Xi|=B$, the B-term approximation is given by $$\langle q_i, \Delta \rangle \approx \sum_{\varepsilon \in \Xi} \hat{q}_i[\varepsilon] \hat{\Delta}[\varepsilon]$$

for $0 \leq i < s$.

B-term approximations arise from choosing an arbitrary progression order to evaluate a vector query. The theorems that follow state that, in a certain sense, the biggest-B approximations give the best B-term approximations.

When choosing a progression order to evaluate a batch of queries, it is important to understand how large the structural error penalty can be at each step. The next result shows that biggest-B approximations provide the smallest possible worst-case error, making the progression order used by Batch-Biggest-B optimal. The proof of this result also provides a sharp, easily computed bound on the structural error penalty of any B-term approximation.

Assume that $\Sigma|\hat{\Delta}[\epsilon]|$ is known. Given a batch of vector queries $q_0, \ldots, q_{s-1}$ and a quadratic penalty function p, the worst case penalty for the p-weighted biggest-B approximation is less than or equal to the worst case penalty for any other B-term approximation.

For any B-term approximation that uses wavelets in the set $\Xi$, let $\xi'$ be the most important unused wavelet: $\epsilon' \notin \Xi$ and $i_p(\epsilon) > i_p(\epsilon')$ implies $\epsilon \in \Xi$. Now the error vector $\epsilon$ is given by $\epsilon = Q_\Xi \hat{\Delta}$ where the matrix $Q\Xi$ has $Q_\Xi[i, \xi] = \hat{q}_i[\xi]$ if $\xi \notin \Xi$ and is zero otherwise. Denoting $K = \Sigma|\hat{\Delta}[\xi]|$ Jensen's inequality allows us to write:

$$p(\varepsilon) = p(Q_\Xi \hat{\Delta})$$
$$= p\left(\sum_{\xi \notin \Xi} |\hat{\Delta}[\xi]| sgn(\hat{\Delta}[\xi]) Q_\Xi[i, \xi]\right)$$
$$\leq K^{-1} \sum_{\xi \notin \Xi} |\hat{\Delta}[\xi]| p(K Q_\Xi[i, \xi])$$
$$= K^{\alpha-1} \sum_{\xi \notin \Xi} |\hat{\Delta}[\xi]| p(Q_\Xi[i, \xi])$$
$$= K^{\alpha-1} \sum_{\xi \notin \Xi} |\hat{\Delta}[\xi]| l_p(\xi)$$
$$\leq K^\alpha l_p(\xi')$$

Where $\alpha$ is the degree of homogeneity of the penalty function. In fact, equality is obtained when $\hat{\Delta}$ is entirely concentrated on $\xi'$.

Thus the worst case error for any B-term approximation is given $$\varepsilon_{worst-case}(\Xi) = \max_{\xi \notin \Xi} l_p(\xi) = K^\alpha l_p(\xi')$$

So if $\Xi$ is not a biggest-B strategy, there is an $\eta \in \Xi$ with $i_p(\eta) < i_p(\xi')$. Substituting $\xi'$ for $\eta$ in $\Xi$ a strategy that is at least as good as $\Xi$ is obtained. A finite number of these substitutions produces a biggest-B strategy which is at least as good as $\Xi$.

Because norms are examples of structural error penalty functions, the theorem above immediately implies the following:

The p-weighted biggest-B approximation minimizes the worst case $L^p$ error for $1 \leq p \leq \infty$.

In other words, many of the standard penalty functions used to measure the magnitude of vectors can be used with Batch-biggest-B to minimize the worst case error.

Now we turn the attention to analysis of average penalty. When discussing the average penalty of a B-term approximation, we mean the expected penalty of the approximation on a randomly selected database. Surprisingly, it turns out that the best strategy for controlling worst case error is also the best strategy for controlling the average error.

Let data vectors be randomly selected from the set $S^{N^d-1} = \{\hat{\Delta}[\Sigma_T \hat{\Delta}[x]^2 = 1\}$ with uniform distribution and let $p(\epsilon) = \epsilon^T A \epsilon$ be a quadratic penalty function. The expected penalty incurred by using the p-weighted biggest-B approximation of a query batch is less than or equal to the expected penalty incurred using any other B-term approximation.

Take any B-term approximation that uses wavelets in the set $\Xi$. For any data vector $\Delta \in S^{N^d-1}$ the error vector is written as $\epsilon = Q_\Xi \hat{\Delta}$. The penalty of this error is given by a quadratic form in $\hat{\Delta}$ $$p(\epsilon_0, \ldots, \epsilon_{x-1}) = \hat{\Delta}^T Q_\Xi^T A Q_\Xi \hat{\Delta} \stackrel{dot'}{=} \hat{\Delta}^T R \hat{\Delta}$$

and the expected penalty can be computed by integrating over the unit sphere $S^{N^d-1}$ equipped with the rotation-invariant Lebesgue measure, dP, normalized to make it a probability space. The argument that follows relies on the fact, stated formally in Equation (below), that rotations do not change this measure.

$$E_\Delta[p] = \int_{S^{N^d-1}} \hat{\Delta}^T R \hat{\Delta} dP(\Delta)$$

Using the fact that for any unitary matrix U and any function $f$ on the sphere $$\int_S f(U\Delta) dP(\Delta) = \int_S f(\Delta) dP(\Delta) \quad (3)$$

This is just a formal statement of the fact that rotations do not change the measure—the probability is uniformly distributed on the sphere. Noticing the $\hat{\Delta} = W\Delta$ where W is the unitary matrix for the wavelet transform, Equation 3 can be written $$E_\Delta[p] = \int_{S^{N^d-1}} \hat{\Delta}^T R \hat{\Delta} dP(\hat{\Delta})$$

Because R is symmetric, it can be diagonalized. There is a diagonal matrix D and a unitary matrix U such that $R = U^T D U$. Using Equation rotation-invariance once more, $$E_\Delta[p] = \int_{S^{N^d-1}} \hat{\Delta}^T D \hat{\Delta} dP(\hat{\Delta})$$

$$= \sum_{i=0}^{N^d-1} D[i,i] \int_{S^{N^d-1}} |\hat{\Delta}[i]|^2 dP(\hat{\Delta})$$

$$= (N^d - 1)^{-1} \text{trace}(D)$$

where the last equality follows from the fact that on any n-sphere $$\int_{S^n} x_i^2 dP = \frac{1}{n} \sum_{k=0}^{a} \int_{S^n} x_k^2 dP = \frac{1}{n}$$

Now D and R are similar matrices, trace (D)=trace (R), so $$E_\Delta[p] = (N^d - 1)^{trace}(R)$$

By the definition of R, $$\text{trace}(R) = \sum_{\xi \notin \Xi} \sum_{i,j} \hat{q}_i[\xi] A_{ij} \hat{q}_j[\xi],$$

Which is clearly minimized by placing those $\xi$ where $$\sum_{i,j} \hat{q}_i[\xi] A_{ij} \hat{q}_j[\xi]$$

is largest in $\Xi$. The p-weighted biggest-B strategy does this.

The two theorems above are used to justify the statement that the biggest-B approximation is also the best-B approximation. Notice also that the proof of the first theorem provides a guaranteed upper bound for observed error penalty. The proof of the second theorem provides an estimate of the average penalty.

In addition the invention further a novel data access pattern. Because wavelets are now being considered as a tool for general purpose data storage, queries on wavelet data require a distinct access pattern to exploit a best-possible I/O complexity for point and range query evaluation. In particular the invention provides an allocation to blocks of size B that guarantee that at least $\lfloor \lg B \rfloor$ values will be used on every disk block retrieved. This is proved by the fact that all non-redundant block allocations, the average number of useful values per disk block is less than 1+lg B. Furthermore, for any query or batch of queries, it is possible to assign an importance to each disk block so that by retrieving disk blocks in decreasing order of importance, one can obtain excellent progressive query approximations that converge quickly to the correct answer.

The invention provides access patterns required for processing pint and range queries on wavelet data. The process includes: Allocation of wavelet coefficients to disk blocks of size B so that if at least one item on the block is needed to answer a point query, then at total of $\lfloor \lg B \rfloor$ items on the lock will be needed. The invention further provides a proof that the allocation of is essentially optimal: for all disk block of size B, if the block must be retrieved to answer a query, the expected number of needed items on the block is less than 1+lg B. The invention also provides an extension of these results to multi-dimensional data and range queries. The invention further provides a definition of a query dependent importance function on disk blocks which allows performance of the most valuable I/O's first and deliver excellent approximate results progressively during query evaluation The invention solves a very practical problem that of a wavelet-based query answering system. The experimental results demonstrate quantitatively how important block allocation is for efficient query answering, and that some apparently natural strategies perform three to four times worse.

Haar wavelets provide an orthonormal basis for the vector space of all functions on a data domain. We denote the data domain by D, and assume that it is a d-dimensional lattice. When wavelet coefficients are stored, they are stored as a representation of a function. This makes a particular type of query very natural: A point query on a dataset containing a representation of a function $f: D \rightarrow R$ specifies a point $x \in D$, and receives $f(x)$ as an answer.

A relation can be represented by its data density or measure density function. When this is done, a large class of range aggregate queries are seen to be inner products of query functions with data functions in the function space. Specifically, it is possible to support traditional aggregate functions such as COUNT, SUM and AVERAGE, as well as less traditional aggregates including COVARIANCE, REGRESSION-SLOPE, and KURTOSIS so long as the following basic range query is supported: A polynomial range-sum on a dataset containing a representation of a function $f: D \rightarrow R$ specifies a range $R \subset D$ and a polynomial p on the coordinates of points in D, and receives $$\langle f, pX_R \rangle = \sum_{x \in R} p(x)f(x)$$

as an answer.

For a point query the only wavelet coefficients needed to reconstruct the value of a function at a point x are those corresponding to wavelets that are not zero at x. In other words, only wavelets whose support overlaps x are of interest.

One of the fundamental observations is that (when certain technical conditions are satisfied) the only wavelets that are relevant for answering a polynomial range-sum query are those whose support overlaps a corner of the range R. Thus in a d-dimensional domain, a polynomial range-sum query requires the same disk access as $2^d$ point queries.

The wavelet overlap query on a dataset of wavelet coefficients specifies a point $x \in D$ and returns the set of all wavelet coefficients for wavelets whose support overlaps x. Denoting this query by WQ(x) we write WQ(x)=$\{a_{j,k} | \psi_{j,k}(x) \neq 0\}$, where $a_{j,k} = \langle f, \psi_{j,k} \rangle$ denotes the wavelet coefficient of the stored function $f$ at resolution level j and offset k.

This is the fundamental query of interest when storing data in any wavelet basis, but for the particular case of one-dimensional Haar wavelets, an explicit definition of the set: WQ(x)=$\{a_{j,k} | 2^j k \leq x < 2^j(k+1)\}$.

Before we can find the best possible disk allocation, we need a precise notion of what a disk allocation is and how access patterns for wavelet overlap queries determine which blocks will be retrieved.

In particular, our access patterns can be captured by the wavelet dependency graph, a directed acyclic graph whose leaf nodes correspond to points in the data domain, and whose internal nodes correspond to wavelets. The key observation is that to answer WQ(x) the exact wavelet coefficients corresponding to nodes on the graph reachable from the leaf x needs to be retrieved. With this framework, an allocation of wavelet data to disk blocks corresponds to a tiling of the (internal nodes of the) dependency graph, and the I/O cost of a wavelet overlap query is just the number of tiles reachable from a leaf node in the graph.

If it is assumed that a disk block holds B wavelet coefficients, and has a unique identifier (e.g., its physical address) the following definition is obtained: A block allocation for a collection of wavelet coefficients is a B to one function from wavelets to disk block identifiers. In other words, it is an assignment of wavelets to disk blocks.

It should be noted that it may be necessary to store additional layout information on each disk block in order to specify which wavelet coefficients are store, reducing the number of wavelet coefficients present on each block. This will give block allocations where a wavelet's identifier can uniquely determine its block address a distinct advantage. Fortunately the optimal allocation presented herein has this advantage.

The essence of the access patterns is the following:
The dependency graph for Haar wavelets on a domain D is the directed acyclic graph G=(V,E) defined as follows. Let $\hat{D}$ denote the set of all Haar wavelets on D, and let the V=D$\cup\hat{D}$.

In other words the vertices of the graph are either points in the domain or wavelets on the domain. The edges are defined by the following rules For two wavelets $\xi,\eta$ the pair $(\xi,\eta) \in E$ if and only if $\eta(x)=0$ implies that $\xi(x)=0$ (the interval where $\xi$ "lives" is contained in the interval where $\eta$ "lives").

For $x \in D, \xi \in \hat{D}$, the pair $(x,\xi) \in E$ if and only if $\xi(x) \neq 0$ and there is no wavelet $\eta$ such that $(\eta,\xi) \in E$.

For two points $x,y \in D, (x,y) \notin E$.

For a one-dimensional domain, this graph is a tree.

Figure 14:
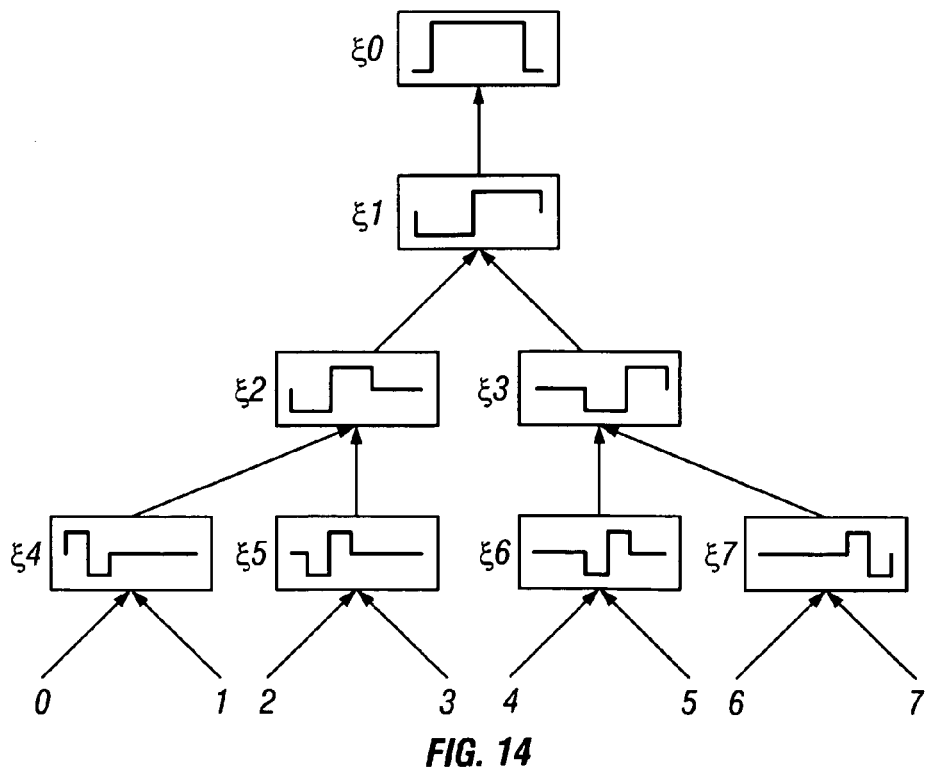
FIG. 14 is a dependency graph for one-dimensional Haar wavelets on a domain of size S.

This definition is cumbersome but explicit. To make this more concrete, an example dependency graph is depicted in FIG. 14 for Haar wavelets on a domain of size eight. At each node in the figure we depict the graph of the corresponding wavelet. The topmost node corresponds to the constant function, and wavelet coefficients for this node are just averages over the entire domain. At the next level a low frequency wavelet whose support covers the entire domain is obtained. As higher resolution levels are obtained, the size of the support is halved, and the "frequency" is doubled. In one dimension, the dependency graph is isomorphic.

There is another characterization of this graph of interest. The dependency graph for Haar wavelets is the minimal graph G with vertices V=D$\cup\hat{D}$ such that if $\xi_1$ is needed to answer WQ(x) and $\xi_2$ is reachable from $\xi_1$, then $\xi_2$ is also needed to answer the query. In particular WQ(x)=$\{a_\xi |$ there exists a path from $x\xi\}$. In other words, using this graph turns the wavelet overlap query into a reachability query on a dag. Block allocations can also be replaced with vertex tilings.

A tiling for a graph G=(V,E) with tiles of size B is a partition of the vertices into disjoint tiles $T_i$ with $|T_i| \leq B$.

There is clearly a one to one correspondence between tilings of (the internal nodes of) the dependency graph and block allocations. Moreover, this gives us a simple definition of the I/O cost of a wavelet overlap query.

For a given block allocation, the number of disk blocks that must be retrieved to answer a wavelet overlap query WQ(x) is equal to the number of tiles reachable from x in the tiling corresponding to the block allocation.

So to reduce the I/O cost of answering wavelet overlap queries, we should find tilings that are "minimally reachable". Intuitively, it seems that by ensuring that whenever a tile is reachable from a point, it has many vertices that are reachable from that point it would do well. The number of vertices reachable from a point is independent of the tiling. If each reachable tile covers a large number of the reachable vertices, then all reachable vertices will be covered with a small number of tiles. So it seems that a particular tile is good if it has a high usage rate.

For a dag G=(V,E), a tile $T \subset V$, and a source $s \in V$, the usage rate of T at s is u(T,s)=$|\{v \in T | v$ is reachable from $s\}|$. Denote the number of sources that can reach T by S(T). The average usage of T is $$u(T) = \frac{1}{S(T)} \sum_{s \in sources(G)} u(T, s).$$ (1a)

Figure 15A:
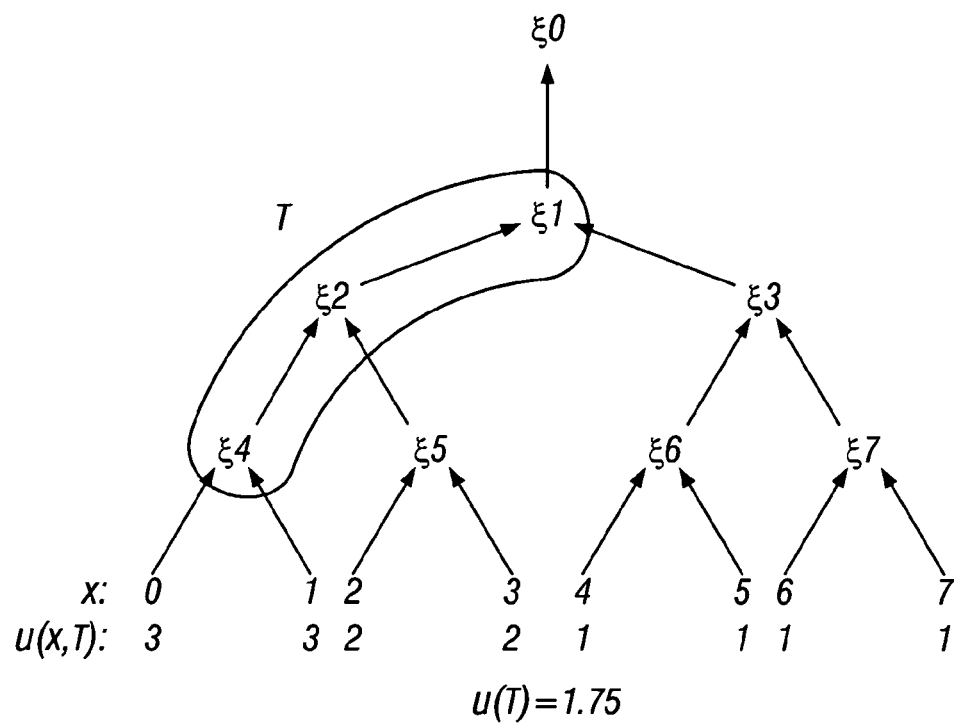
FIG. 15 shows an example of straight-line and optimal tiles of size 3, along with usage rates.
Figure 15B:
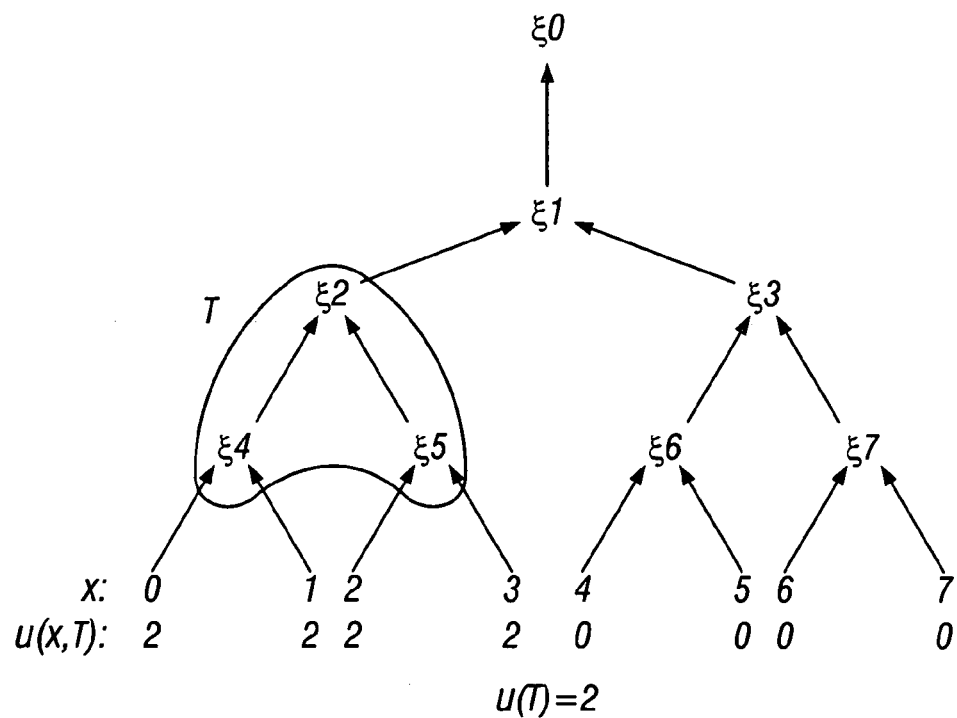

So if wavelet overlap queries are generated randomly with the uniform distribution over the data domain, the average usage of a tile corresponds to the expected number of items to be used on a disk block, given the fact that the block had to be retrieved. Example tiles with usage rates can be seen in FIG. 15. There is a closely related function that indicates whether a tile is reachable from a particular source.

For a dag G=(V,E), tile T⊂V, and a source s⊂V the requirement function r(T,s) is 1 if some element of T is reachable from s (u(T,s)>0), and is zero otherwise.

Notice that $$S(T) = \sum_{s \in sources(G)} r(T, s). \quad (2a)$$

While designing tiles with maximal usage seems like a good intermediate goal, eventually minimizing average I/O cost for query answering is the goal. This corresponds to minimizing the average number of tiles reachable from a randomly selected source. Thus the cost of a source s for a tiling T as the number of tiles reachable from s is defined as $$c(s) = \sum_{T \in \mathcal{T}} r(T, s). \quad (3a)$$

As discussed more fully below maximizing usage is the same as minimizing cost, a result that relies on the following equation, which is valid for any source s in the one dimensional Haar wavelet dependency graph $$lg|D| = \sum_{T \in \mathcal{T}} u(T, s). \quad (4a)$$

This holds because both sides represent the total number of non-source vertices reachable form s.

In view of the foregoing the usage rates of two tile types can be computed.

Figure 16A:
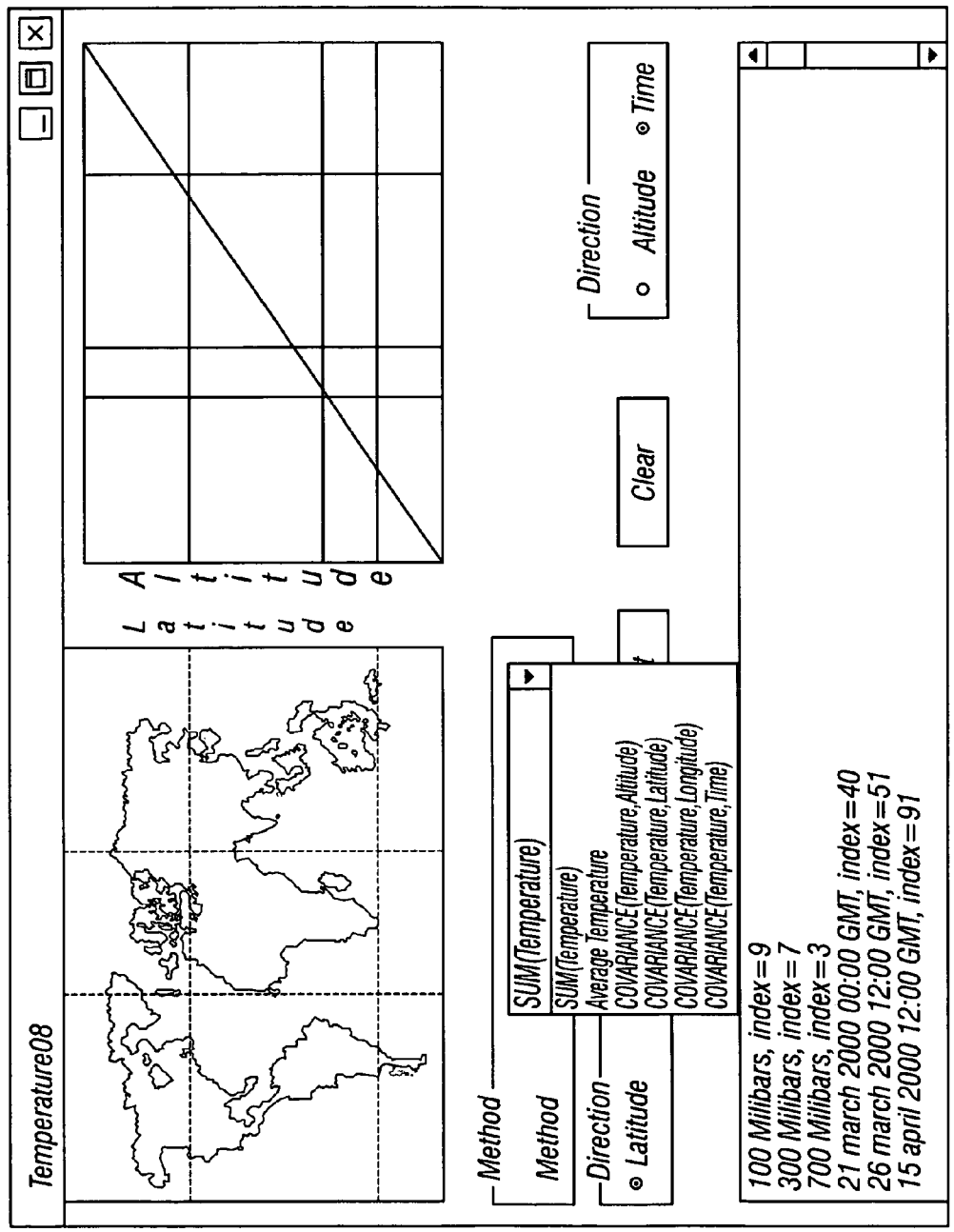
FIG. 16 shows an implementation of approximate and progressive range-sum queries over temperature data stored as wavelet disk blocks.

When answering a wavelet overlap query for a point x∈D, it would be ideal if every tile reached were used entirely. Recalling that for the one-dimensional case, the dependency graph is a binary tree, this can be achieved by choosing "straight-line" tiles of the form T={v,parent(v), parent(parent (v)), . . . , parent$^{B-1}$(v)} so that if there is a path from s to v, then s reaches every element in the tile and u(T,s)=B. An example of a straight-line tile of size three in a domain of size eight can be seen in FIG. 16. Note that by including $\xi_1$ in this tile, the point query at points 0 or 1 is answered quite well, but is answered quite poorly when answering a point query at 4, 5, 6, or 7. This is formalize as follows.

Notice that the number of sources that can reach v is exactly one half of the number of sources that can reach parent(v) because parent(v) is a wavelet that lives on an interval double the size of v. Thus for every source that gets the optimal usage out of T, there is another one that obtains one less than the optimal usage.

So far this may not seem discouraging, but the same argument says that exactly one half of all sources that reach T reach it only at the highest node, parent$^{B-1}$(v), and obtain the worst possible usage rate of one. Thus a recursion for the usage rate of straight-line tiles of (now variable) length B can be written $$U_{straight-line}(B) = 1 + \frac{U_{straight-line}(B-1)}{2} < 2.$$

Thus no matter what the tile size, if T is a straight line tile, u(T)<2. Unless something better is found it will be very difficult to provide scalable access to wavelet data.

Because the straight-line tiles worked so poorly, look at connected tiles that are as short as possible at the other extreme. For convenience, assume that B=2$^{k-1}$ for some natural number k. Then for any vertex v that is at least lg B steps away from any source in the dependency graph, consider the tile T={v'∈V|v=parent$^j$(v'), j<lg B}, which is a dense binary tree. An example tile of size three can be seen in FIG. 15.

It is particularly easy to compute the average usage of this tile. In fact the usage rate of this tile is the same from any vertex, and is equal to ⌈lg B⌉. Thus u(T)=⌈lg B⌉. If B is not of the special form assumed above, it may not be able possible to complete the bottom level of the dense binary tree, but it is assured that the usage rate will always be at least ⌊lg B⌋.

It is easy to cover any given dependency graph with these dense connected subtiles (perhaps running out of room at the bottom and settling for "connected-as-possible" tiles). An alternative approach is to map this problem to the problem of finding an optimal B-partitioning of a weighted graph/tree where B is the size of a disk block. In this case, weight of 1 should be assigned to each node of the dependency graph and the weights on its edges should capture u(T). One way to achieve this is by assigning each edge the weight of the number of leaves reachable down of that edge. Regardless of how the covering is generated, it leads directly to a proof of the following theorem which is now restate in new terminology:

A binary tree with N leaf nodes has a tiling such that for every source s∈V and every tile T which does not contain a source node has u(T,s)≦⌊lg B⌋. Furthermore, among the set of all tiles reachable from s, the fraction of these tiles is at least $$\frac{lg_B N}{1 + \lfloor lg_B N \rfloor}.$$

A useful corollary is using the block allocation of the theorem, above, on a domain of size N, one must retrieve no more than 1+lg$_B$N disk blocks to answer a wavelet overlap or point query. Range aggregate queries require no more than twice this amount.

For any tile T with B vertices on the dependency graph for one dimensional Haar wavelets, we must have u(T)≦1+lgB.

We proceed by induction on the tile size, B. The base case of B=1 is trivial—since u(T)=1=1+lgB.

Now the inductive step is made, and assume that the result is true for all tiles T* with |T*|<B. Consider any tile T⊂V with |T|=B. Let r∈V be the root of the subtree generated by T, and denote the part of T that lies in the left and right subtrees of r by $T_L$ and $T_R$ respectively. Notice that |$T_R$|, |$T_L$|<B, therefore the inductive hypothesis applies.

First we will assume that both |$T_R$| and |$T_L$| are nonzero, the exceptional case will be handled below. Denote α=|$T_R$|/|T|<1 and let β be the probability that a randomly selected source that lies below T is on the right side of r. Then $$u(T) \le \beta u(T_R) + 1(1-\beta)u(T_L) + 1 \le$$
$$\beta[1 + lg(\alpha|T|)] + (1-\beta)[1 + lg((1-\alpha)|T|)] =$$
$$1 + lg|T| + \beta lg\varepsilon + (1-\beta)lg(1-\alpha) < 1 + lg|T|$$

Now the exception. If one of $|T_R|$ and |$T_L$| is empty then r∈T since r is the root of the smallest subtree containing T. In this situation β=½ and the size of the non-empty subtile (say it is |$T_R$|) is |$T_R$|=|T|−1. Thus $$u(T) = 1 + \beta u(T_R) \leq 1 + \frac{1}{2}(\lg(|T|-1)+1) < 1 + \lg|T|$$

when $|T| \leq 2$. So the exception has been handled, and the theorem proved.

It seems that this limit on average utility of a tile must also place limits on the cost of a wavelet overlap query. This is the content of the next result.

For all tilings with tiles of size B on a domain of size N, sampling sources uniformly, the average cost of a wavelet overlap query is at least $\lg_B N$.

$$E_s[c(s)] = \frac{1}{N}\sum_{s \in D} c(s) = \frac{1}{N}\sum_{T \in \mathcal{T}} S(T) \geq \frac{1}{N}\sum_{T \in \mathcal{T}}\sum_{s \in D}\frac{u(T,s)}{\lg B} = \sum_{s \in D}\frac{\lg N}{N \lg B} = \lg_B N$$

The optimal disk block allocation for one dimensional wavelets can be used to construct optimal allocations for (tensor product) multivariate wavelets. Simply decompose each dimension into optimal virtual blocks, and take the Cartesian products of these virtual blocks to be the actual blocks. This arrangement allows the following result.

In a d-dimensional domain of size $N^d$, when wavelet coefficients are stored using the Cartesian product optimal block allocation, the I/O cost of the multi-dimensional wavelet overlap query in a domain of size N is $O(\lg^d_B N)$. Furthermore, if the dimensions all have the same size then for any Cartesian product block strategy, the average I/O cost will be $\Omega(\lg_B^d N)$.

This lower bound holds for all block allocations, not just Cartesian product allocations. In any case, this allows an answer to polynomial range-sum queries quickly: When wavelet coefficients are stored using the Cartesian product optimal block allocation, the I/O cost of polynomial range-sum query evaluation is $O(2^d \lg^d_B N)$. If the dimensions all have size N, then the I/O cost will also have the lower bound $\Omega(2^d(\lg_B N - 1)^d)$.

The progressive query answering strategies presented herein are based on the observation that some wavelet coefficients are much more important for a query answer than others. This allows us to compute the importance of each record to be retrieved and fetch the most important items first. The approximate answers returned progressively minimize both average and worst case error.

The results above show that considerable savings can be achieved by placing wavelet data on disk blocks in an appropriate way and retrieving coefficients at block level granularity. In order to obtain progressive query results in this setting, the importance of disk blocks need to be computed rather than individual wavelets.

When evaluating a single range-sum query, the importance of a data wavelet coefficient can be defined as the (square of the) magnitude of the corresponding query wavelet coefficient. In other words, denoting the importance of a wavelet $\xi$ by $\iota(\xi)$ and denoting the wavelet coefficients of a query vector q by $\hat{q}(\xi)$, we can take $i(\xi) = |\hat{q}(\xi)|^2$.

An inspection of the proofs of the theorems above in shows that there are two natural ways to extend this definition to disk blocks: by either choosing the importance function to minimize worst-case error, or by choosing it to minimize average error. In particular, one can define two block-importance functions $$\iota_2(B) = \sum_{\xi \in B}|\hat{q}(\xi)|^2 \qquad \iota_\infty(B) = \max_{\xi \in B}|\hat{q}(\xi)|$$

and adapt the arguments to prove the following result: By fetching disk blocks in decreasing order of $\iota_\infty$-importance, the worst case error of our query is a progressively minimized approximation. By fetching disk blocks in decreasing order of $\iota_2$-importance, the average square error of our query is a progressive minimization of approximation.

These results extend in a natural way to provide control of structural error in batch query answers.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

EXAMPLES

Results with ProPolyne and related algorithms are presented here in order to demonstrate an overview of how these techniques perform on real-world data. ProPolyne-FM's worst-case performance as an exact algorithm (which is very similar to the performance of ProPolyne) is compared with related exact pre-aggregation methods in Table 1.

TABLE 1

| Algorithm | Query cost | Update cost | Storage cost |
| --- | --- | --- | --- |
| ProPolyne-FM | $(2\log N)^d$ | $\log^d N$ | $\min\{|I||\log^d N, N^d\}$ |
| SDDC | $(2\log N)^d$ | $\log^d N$ | $N^d$ |
| Prefix-Sum | $2^d$ | $N^d$ | $N^d$ |
| Relative Prefix-Sum | $2^{2d}$ | $N^{d/2+1}$ | $N^d$ |

The experiments show that wavelet-based query approximation delivers consistently accurate results, even on datasets that are poorly approximated by wavelets. Not only is the performance consistent, it is consistently better than data approximation. By directly comparing the methods with the wavelet-based data compression method proposed by Vitter and Wang (In Proc. EDBT, pp. 120-134, 1999) the invention demonstrates that query approximation based ProPolyne delivers significantly more accurate results after retrieving the same number of values from persistent storage.

The results presented herein are based upon experiments on three datasets. PETROL is a set of petroleum sales volume data with 56504 tuples, sparseness of 0.16%, and five dimensions: location, product, year, month, and volume (thousands of gallons). PETROL is an example of a dataset for which traditional data approximation works well.

GPS is a set of sensor readings from a group of GPS ground stations located throughout California. A projection of the available data is used to produce a dataset with 3358 tuples, sparseness of 0.01%, and four dimensions: latitude, longitude, time, and height velocity. The presence of a tuple (lat., long., t, v) means that a sensor observed that the ground at coordinates (lat., long.) was moving upward with a velocity of v at time t. GPS is an example of a dataset for which traditional data approximation works poorly.

TEMPERATURE is a dataset holding the temperatures at points all over the globe and at 20 different altitudes on Mar. 1, 2001. It has 207360 tuples, sparseness of 1.24%, and four dimensions: latitude, longitude, altitude, and temperature. The TEMPERATURE dataset is considerably larger than the GPS and PETROL datasets, and is used to emphasize the fact that as datasets get larger, the benefit of using ProPolyne increases.

For all tests, 250 range queries were generated randomly from the set of all possible ranges with the uniform distribution. If a generated range selects fewer than 100 tuples from the dataset, it is discarded and a new range is generated.

All graphs presented in the figures display the progressive accuracy improvement of various approximation techniques for queries on a single dataset. The horizontal axis displays the number of values retrieved by an algorithm on a logarithmic scale. The vertical axis of each graph displays the median relative error for a set of generated queries. Relative error is used so that queries returning large results do not dominate the statistics. Median error is used rather than mean error in order to avoid the noise caused by the one-sided fat tail of observed relative error. The results using mean error are qualitatively similar, but are not as smooth.

Figure 4A:
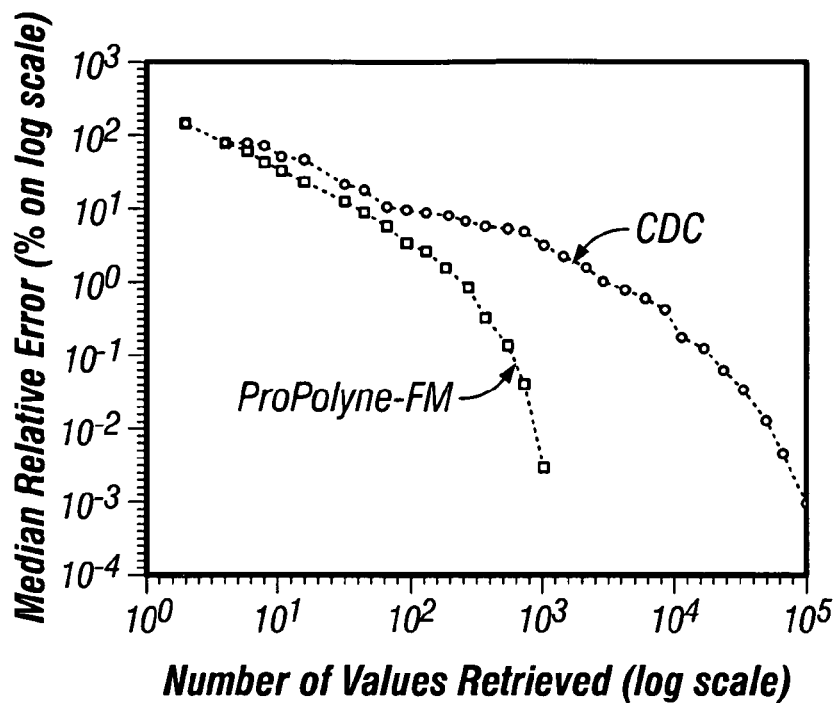
FIG. 4 shows a graph depicting the progressive accuracy for Compact Data Cube (CDC) and ProPolyne-FM on two databases (a) PETROL and (b) GPS.
Figure 4B:
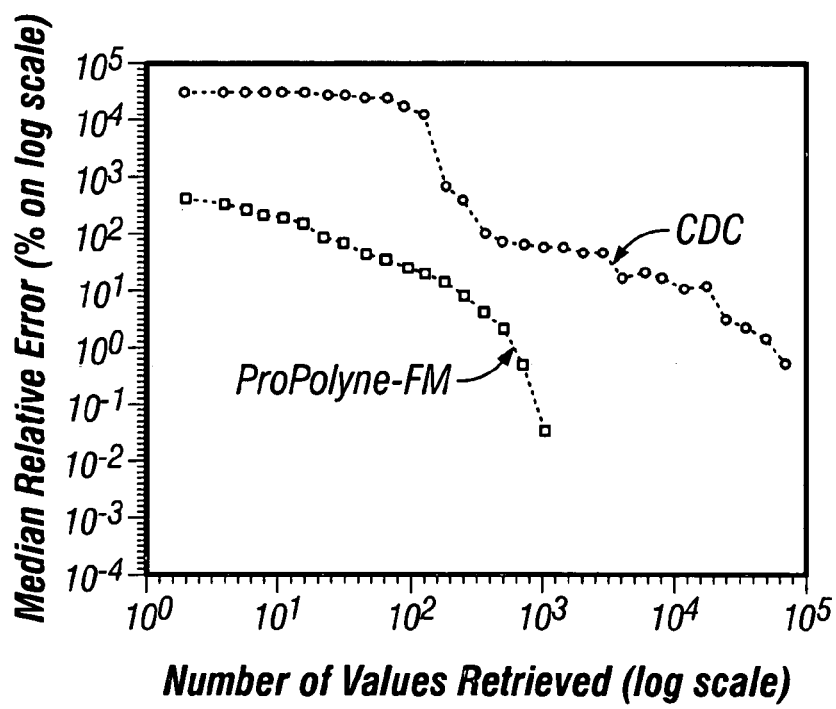

FIG. 4 compares the performance of ProPolyne-FM with a progressive version of the compact data cube (CDC) on the PETROL and GPS datasets. Other techniques have been compared favorably to the CDC. The CDC works well on the PETROL dataset, producing a median relative error under 10% after using less than 100 wavelet coefficients. Still, ProPolyne-FM works better than CDC from the beginning, and this difference only grows as evaluation progresses. The difference between the performance of the two techniques on the GPS dataset is striking: CDC must use more than five times as many wavelet coefficients as there were tuples in the original table before providing a median relative error of 10%. ProPolyne-FM reaches this level of accuracy after retrieving less than 300 wavelet coefficients.

Figure 5A:
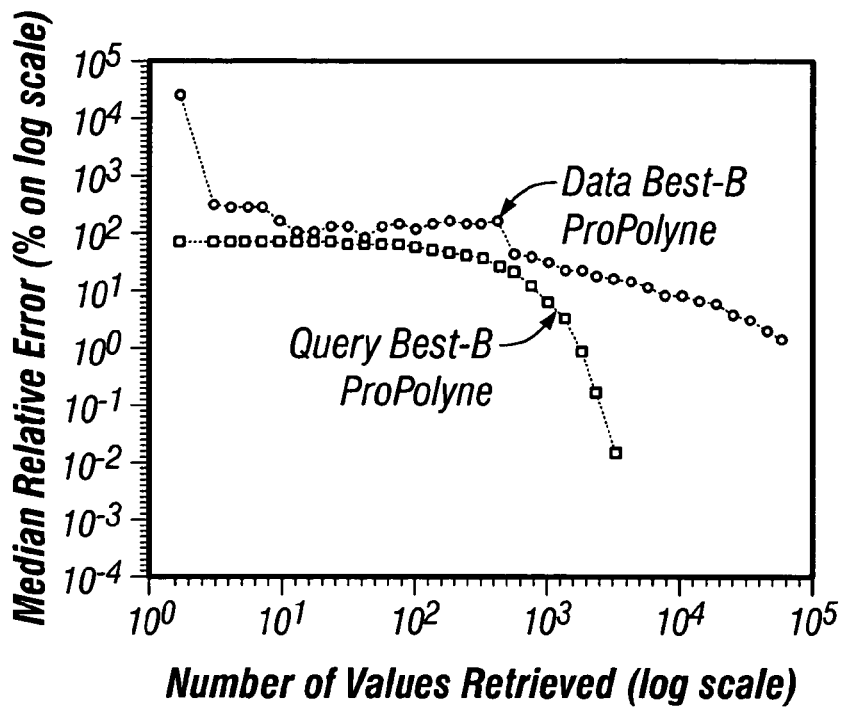
FIG. 5 shows a graph depicting the progressive query accuracy for databest-B and query best-B ProPolyne for two databases (a) PETROL and (b) GPS.
Figure 5B:
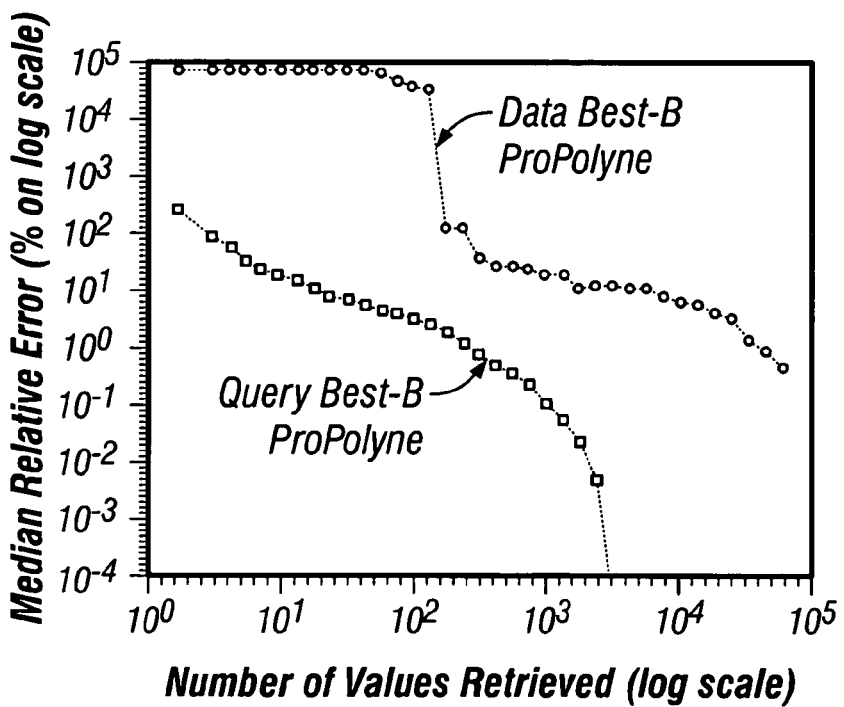

FIG. 5 compares the performance of data best-B ProPolyne and query best-B ProPolyne on the PETROL and GPS datasets. Unlike the prior experiment (presented in FIG. 4), the queries for these tests slice in all dimensions, including the measure dimension. Data best-B ProPolyne can be thought of as an extension of CDC that supports this richer query set. As in the prior analysis, the method based on query approximation consistently and significantly outperforms the analogous data compression method. By the time query best-B ProPolyne has achieved a median error of 10%, data best-B ProPolyne still has a median error of near 100% for the PETROL dataset. The data best-B ProPolyne error for the GPS dataset at this point is enormous. Notice also that the data best-B results exhibit accuracy "cliffs" where the progression reaches a set of coefficients that are particularly important for the given query workload. This hints that query workload information is critical to improving the ordering of data best-B coefficients.

Figure 6A:
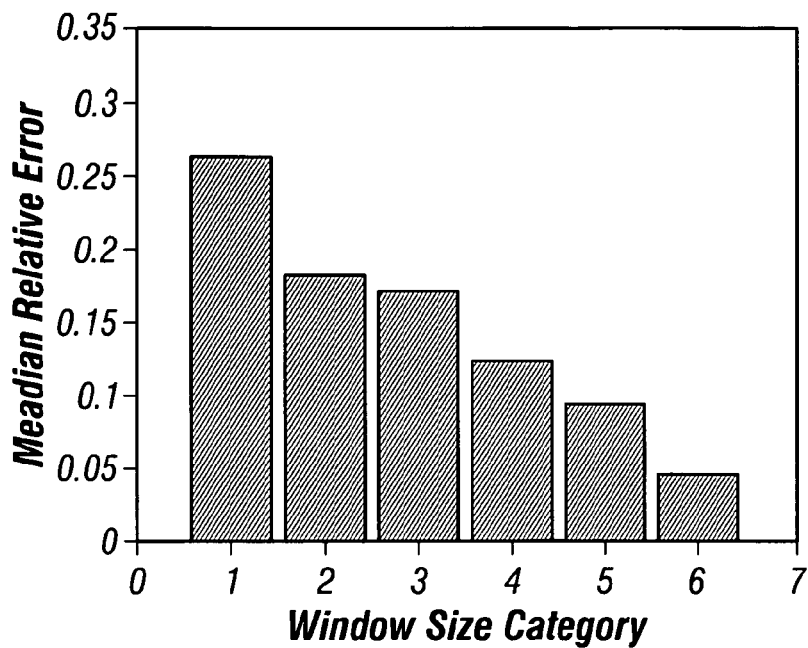
FIG. 6 collectively shows a query Best-B ProPolyne on a TEMPERATURE dataset. (A) shows the relative error vs. range size after retrieving 500 values. (B) shows second order statistics.

Finally, FIG. 6 illustrates the progressive accuracy of query best-B ProPolyne On the TEMPERATURE dataset. FIG. 6(a) displays relative error for AVERAGE queries on randomly generated ranges of different sizes. The size of a range is defined to be the product of the lengths of its sides. Larger ranges have better approximate results, suggesting that a basis other than wavelets may provide better approximation of query workloads with small ranges.

Figure 6B:
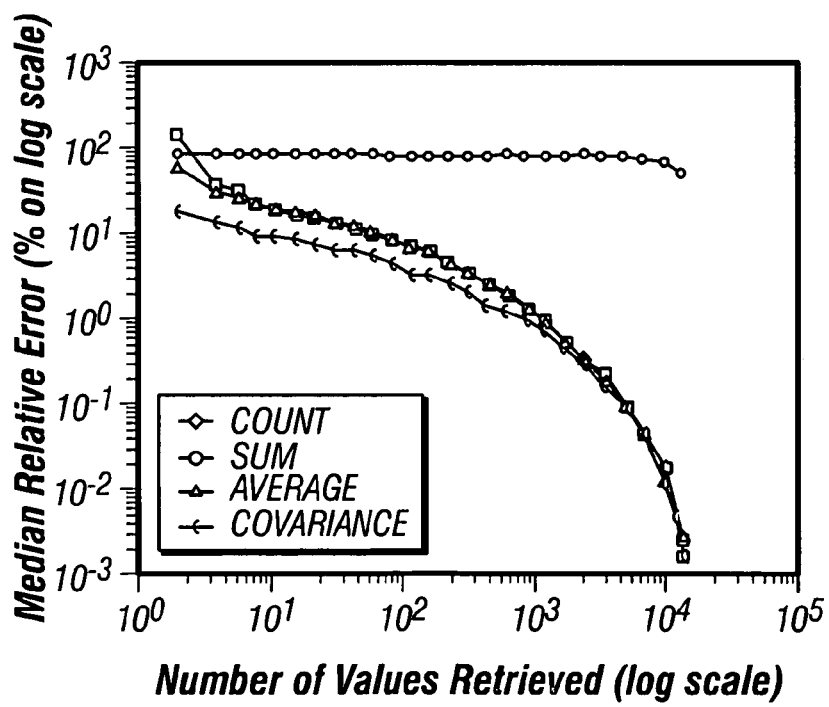

FIG. 6(b) displays progressive relative error for COUNT, SUM, AVERAGE, and COVARIANCE queries on the TEMPERATURE dataset. It should be noted that COUNT, SUM, and AVERAGE all obtain excellent accuracy after retrieving a very small number of wavelet coefficients. AVERAGE is significantly more accurate early in the computation, obtaining a median relative error below 10% using just 16 data wavelet coefficients. COUNT and SUM both achieve this level of accuracy using close to 100 data wavelet coefficients. COVARIANCE stands out by not having significantly improving accuracy until near the end of the computation. The methods of the invention provide exact results for COVARIANCE just as quickly as for other query types. The slow convergence is largely due to the fact that the covariance is computed by subtracting two large approximate numbers to obtain a relatively small number.

The invention provides ProPolyne, a novel MOLAP pre-aggregation strategy, which can be used to support conventional queries such as COUNT and SUM alongside more complicated polynomial range-sums. ProPolyne is the first pre-aggregation strategy that does not require measures to be specified at the time of database population. Instead, measures are treated as functions of the attributes, which can be specified at query time. This approach leads to a new data independent progressive and approximate query-answering technique, which delivers excellent results when compared to other proposed data compression methods. ProPolyne delivers all of these features with provably poly-logarithmic worst-case query and update cost, and with storage cost comparable to or better than other pre-aggregation methods. This work can be extended in several ways. Preliminary experiments indicate that using synopsis information about query workloads or data distributions can dramatically improve sort orders for both query best-B and data best-B techniques.

Dimensionality reduction techniques can improve I/O complexity at the expense of some accuracy in the final results. As presented herein, ProPolyne requires random access to stored data; it is possible to use clustering strategies, which take advantage of ProPolyne's unique access patterns. The limits of linear algebraic query approximation can be explored for approximate query answering. This includes finding complexity lower bounds, investigating more complex queries (e.g., OLAP drill-down, relational algebra), and making an efficient adaptive choice of the best basis for evaluating incoming queries.

By using an exact polynomial range-sum method provided herein, but using the largest query wavelet coefficients first an accurate, data-independent query approximations after a small number of I/Os can be accomplished.

To test the Batch-Biggest-B for polynomial range-sums empirical datasets were used. The following is a sample of results from trials on a dataset of temperature observations around the globe at various altitudes during March and April 2001. The dataset has 15.7 million records and 5 dimensions: latitude, longitude, altitude, time, and temperature. The queries executed partitioned entire data domain into 512 randomly sized ranges, and sum the temperature in each range. The key observations follow.

Observation 1: I/O sharing is considerable. The query batch partitioned the entire data domain. In order to answer the queries directly from a table, all 15.7 million records would need to be scanned. The Db4 wavelet representation of this dataset has over 13 million nonzero coefficients. Repeatedly using the single-query version of ProPolyne requires the retrieval of 923076 wavelet coefficients, approximately 1800 wavelets per range. Using Batch-Biggest-B to compute these queries simultaneously requires the retrieval of 57456 wavelets, approximately 112 wavelets per range. Thus Batch-Biggest-B provides an efficient exact algorithm by exploiting I/O sharing across queries.

In each of these cases notice that only a small fraction of the data wavelet coefficients need to be retrieved. This has nothing to do with the underlying dataset. It is simply a quantification of the fact that ProPolyne is and efficient exact algorithm—most of the data wavelet coefficients are irrelevant for the query. Another way to say this is that most of the query wavelet coefficients are zero.

As mentioned in above Batch-Biggest-B can be used with other transformation based techniques. Using prefix-sums to compute each of these queries requires the retrieval of 8192 precomputed values. When using Batch-Biggest-B to share this retrieval cost between ranges, only 512 prefix-sums are retrieved.

Figure 11:
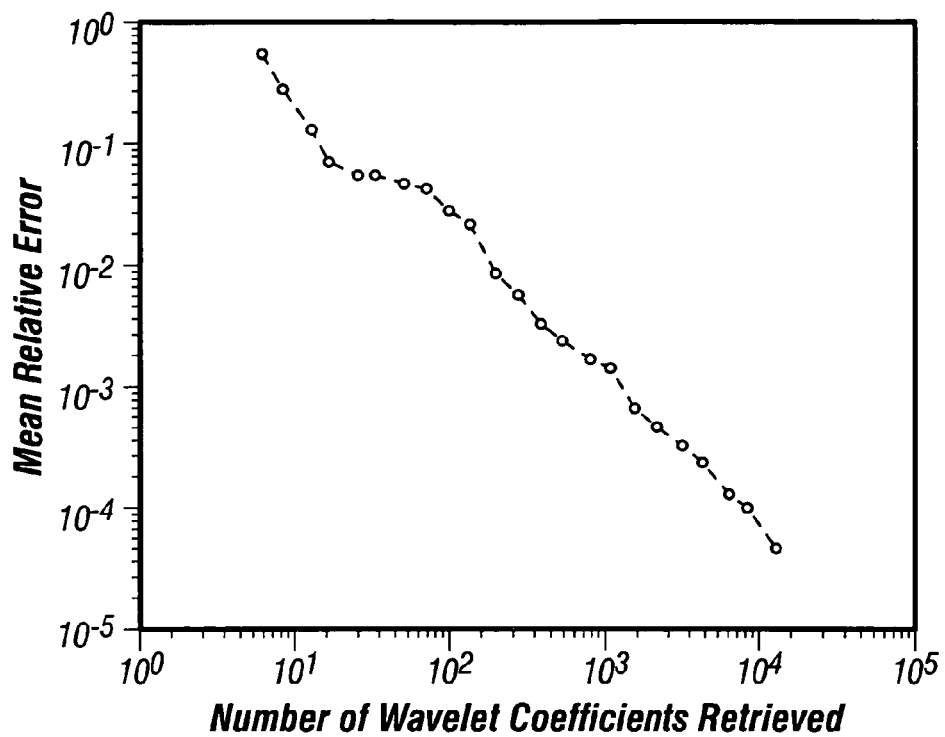
FIG. 11 is a graph depicting a progressive mean relative error for progression minimizing SSE.

Observation 2: Progressive estimates become accurate quickly. FIG. 11 shows the mean relative error of progressive estimates versus the number of coefficients retrieved. After retrieving only 128 wavelets the mean relative error is below 1%. Note the log scale on both axes. Thus an accurate result is achieved after retrieving less than one wavelet for each query answered.

Figure 12:
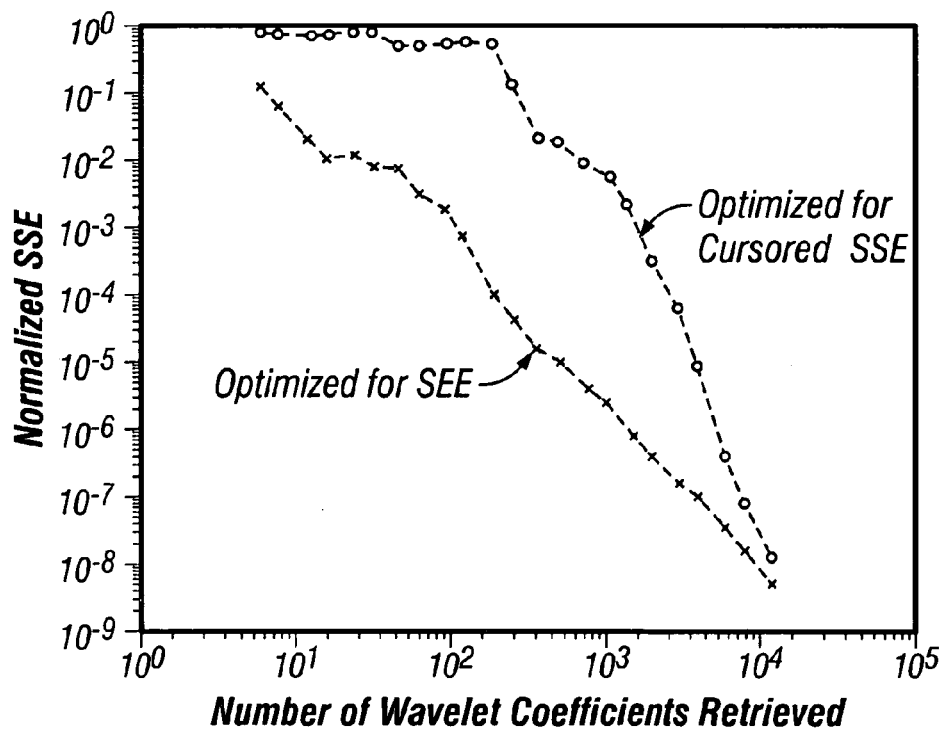
FIG. 12 is a graph depicting a progressive SSE penalty for two progressive query strategies.
Figure 13:
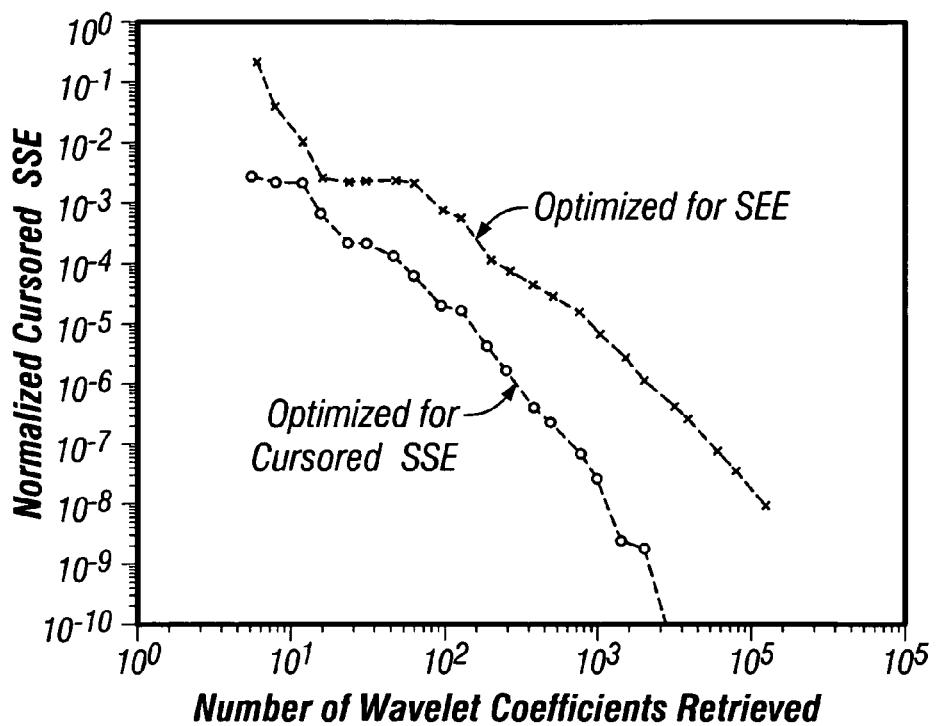
FIG. 13 is a graph showing progressive cursored SSE penalty for two progressive query strategies.

Observation 3: Choosing the right penalty function makes a difference. The implementation accepts arbitrary quadratic penalty functions. FIGS. 12 and 13 display progressive results of query evaluation when minimizing SSE and when minimizing a cursored SSE that prioritizes errors in a set of 20 neighboring ranges 10 times more than it penalizes errors in the other ranges. The horizontal axis of each chart displays the number of wavelets retrieved. FIG. 12 displays the normalized SSE for each of these runs. Normalized SSE is the SSE divided by the sum of square query results. The trial shows that minimizing SSE has substantially and consistently lower SSE than the trial minimizing the cursored SSE. FIG. 13 displays the normalized cursored SSE for the same two trials. The trial shows that minimizing the cursored SSE leads to substantially lower penalty.

Thus, the invention also provides a framework for progressive answering of multiple range-sum queries. Two problems arise in this setting that are not present when evaluating single range-sums: I/O should be shared as much as possible, and the progressive approximation should control the structure of the error according to a penalty function specified by the user. These are addressed with the introduction of Batch-Biggest-B and the proof in theorems herein that using the penalty function to weigh the importance of retrieving a particular record from storage leads to optimal estimates.

These results immediately raise several questions. Foremost among these is the need to generalize importance functions to disk blocks rather than individual tuples. Such a generalization is a step in the development of optimal disk layout strategies for wavelet data (which is further provided by the invention). Combining this analysis with workload information will lead to techniques for smart buffer management. It is possible that these techniques can be used to deliver progressive implementations of relational algebra as well as commercial OLAP query languages.

A progressive range-query answering system was implemented based on the invention. The system is implemented in C# using an ODBC connection to a SQL server to store and access wavelet data (see FIG. 16). This provides an overview of how block allocation choices affect the performance of this system. All experiments were performed on a sample dataset with 15.7 million records and four dimensions: altitude, latitude, longitude, and time. There are 16 altitudes, 128 latitudes, 64 longitudes, and 122 time points, recording temperature every 12 hours during March and April 2001. Temperatures are measured in degrees Kelvin. The system is designed to efficiently answer batches of aggregate queries over ranges that partition the data domain, providing users with a summary view of the entire data set.

The results reported here are based on a randomly generated workload of 100 batch queries, where each batch query partitions the latitude dimension into 8 ranges, and partitions the altitude, longitude, and time dimensions into 4 ranges. The range-sum queries request the average temperature per each range. Dimensions were partitioned into ranges uniformly, so that all possible partitions are equally likely. Experiments were performed with different batch sizes and similar results were found, with the following exceptions. For smaller batches all methods produced very accurate progressive results quickly, even though the I/O cost varied dramatically. This happens because the ranges in a small batch are large, and queries are well approximated by a small number of low resolution wavelets. For large batches, the optimal placement technique still provides much better progressive estimates, but there is very little difference in I/O performance—for a large batch you are essentially scanning the entire dataset, disk placement cannot be of great benefit.

There are two "common sense" block allocations which provide enlightening benchmarks for the invention. One of these allocations is obtained by essentially storing the data in row-major order on disk. The other captures the locality effects of a space-filling curve. The first technique is the most naive: the multi-dimensional wavelet coefficients can be laid out naturally in a one dimensional array. The array is simply cut into contiguous subarrays of equal size to obtain the disk blocks. Specifically, if we denote the value of the $i^{th}$ item in the $b^{th}$ block by $v(b,i)$ and denote the array of wavelet coefficients by $w$ then $v(b,i)=w[B*b+i]$ for blocks of size B. This is (approximately) the allocation that would be obtained by default when the wavelet data is stored as a one dimensional array on disk and let the file system determine the block allocation (i.e., the naive allocation).

The next technique has more respect for the multi-dimensional structure. The wavelet coefficients is now lying in a multi-dimensional array, the data domain is sliced into cubes by slicing each dimension into virtual blocks. Each cell in this slicing will correspond to a disk block and every wavelet coefficient in the cell will be stored in the block. This gives a natural multi-index for the disk blocks and a natural multi-index for wavelet coefficients in each block. Again, denoting the value at location $i=(i_0, i_1, \ldots, i_{d-1})$ in block $b=(b_0, b_1, \ldots, b_{d-1})$ by $v(b,i)$, we have $v(b,i)=w[(B_0 b_0+i_0, B_1 b_1+i_1, \ldots, B_{d-1} b_{d-1}+i_{d-1})]$ where the slices are of size $B_i$ in dimension i (i.e., a slice and dice allocation).

Figure 17:
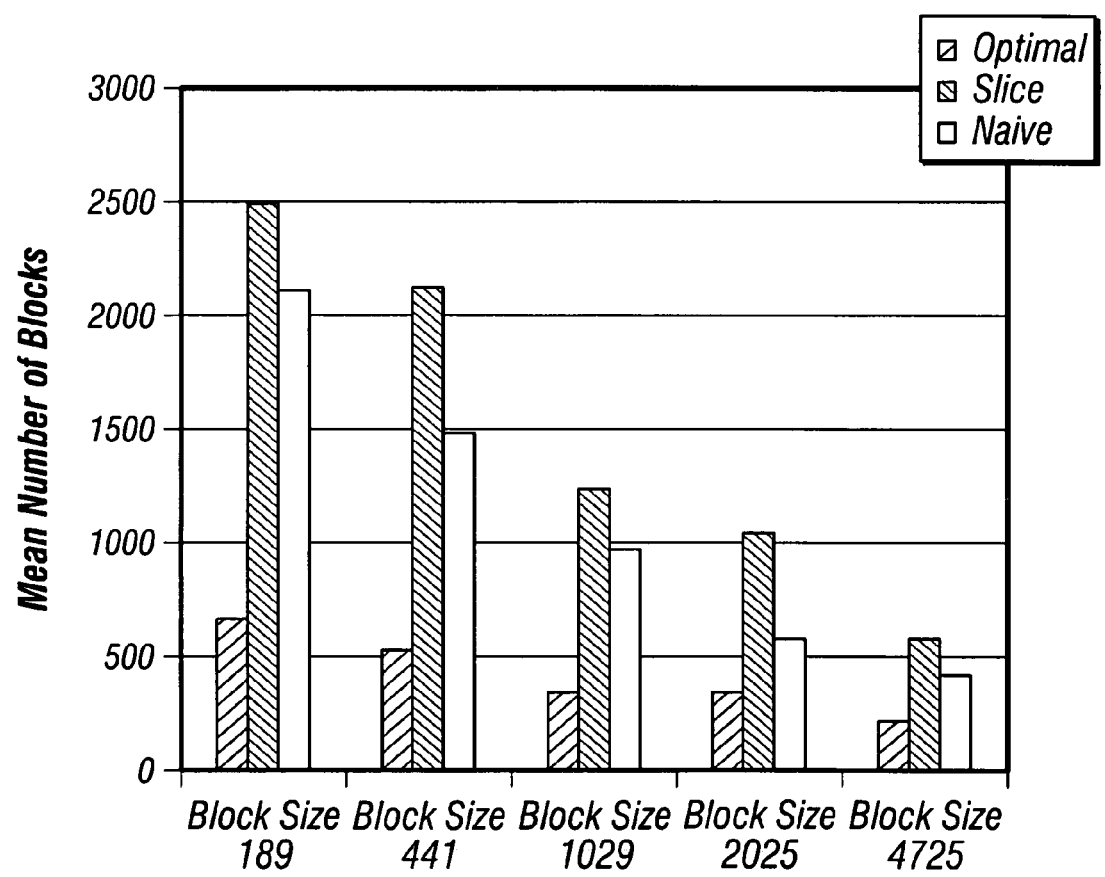
FIG. 17 shows the mean number of blocks needed for exact query answer for a variety of block sizes and allocation techniques.

When answering these batch queries, the number of disk blocks fetched to answer a query using the wavelet-optimal allocation is substantially less than the number retrieved using alternate methods. In FIG. 17 the average number of blocks needed to evaluate the batch queries in the generated workload is shown. Results are shown for the optimal, slice, and naive methods for a variety of block sizes. The block sizes were chosen so that optimal blocks consisting of complete subtree tiles were produced.

An important observation is that the optimal strategy outperforms the other two strategies, often by a factor of three or four. The theory suggests that the optimal strategy should always give the best results, but this evidence demonstrates that the difference is substantial. Another interesting and unexpected observation is that the naive block allocation consistently outperforms the slicing strategy. For all strategies, the number of blocks retrieved is only a small fraction of the total number of blocks in the database. This is because wavelets provide very efficient exact answers to ad hoc range-sum queries.

Another interesting and unexpected observation is that the naive block allocation strategy outperforms the slicing strategy. This could be due to the fact that the naive blocks typically contain both high and low resolution data, while many of the domain slicing blocks contain only spatially localized high resolution data. When these high resolution blocks are retrieved, there are typically only a small number of useful items. Low resolution data are more likely to be useful.

As demonstrated herein wavelets provide excellent approximations of the matrices that arise in evaluation of batch range-sum queries. For any allocation to disk blocks, the importance of a block can be computed so that by performing the most important I/O first one minimizes either worst case or average error.

Although the invention shows that the dependency graph based allocation is the best possible for exact query answering, other strategies may provide better approximate answers early in the computation. The results in this section suggest that this is not the case, and that the optimal placement gives the superior approximate results from the first block onward.

Figure 18A:
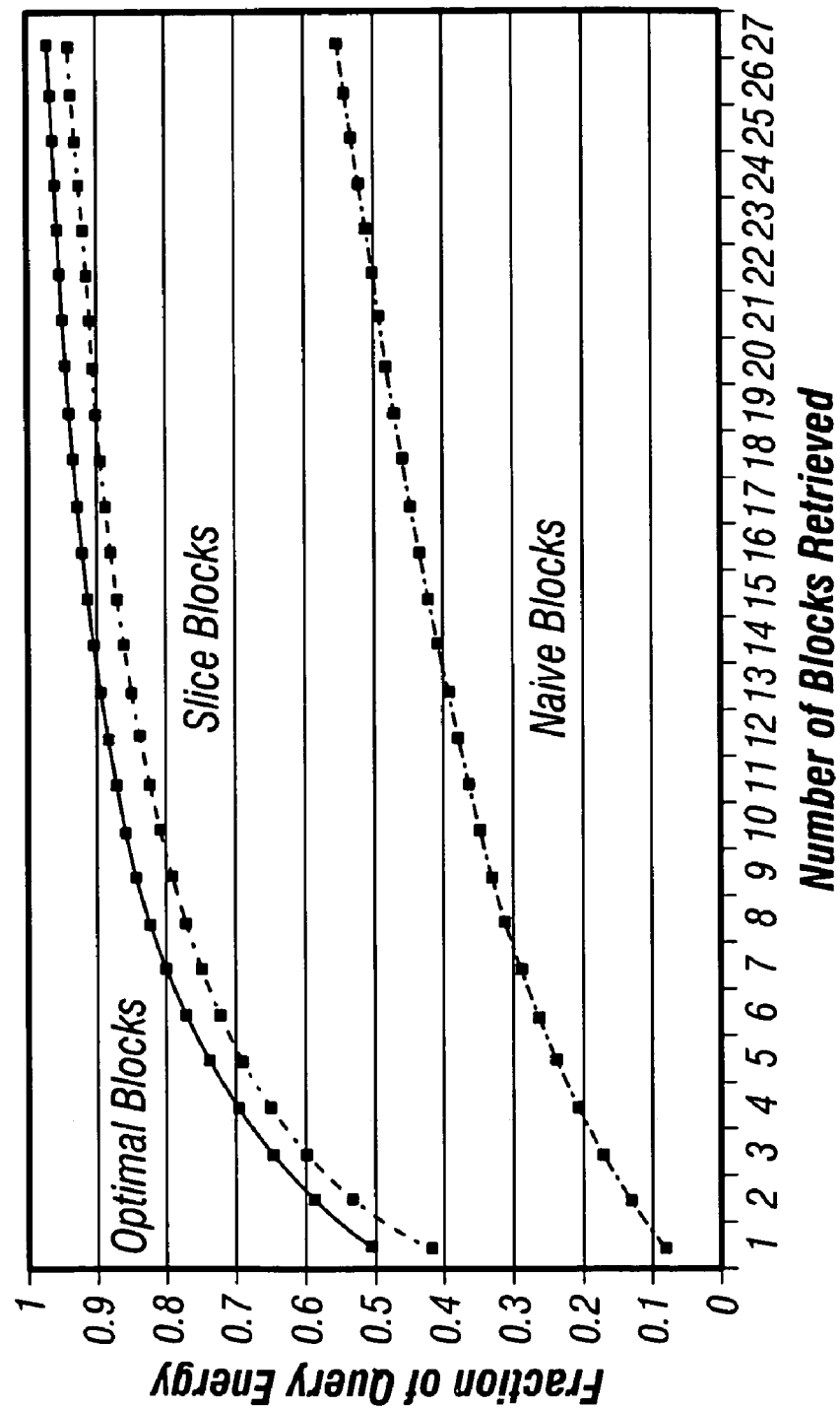
FIG. 18 shows the effectiveness of different allocation strategies for progressive and approximate query answering.
Figure 18B:
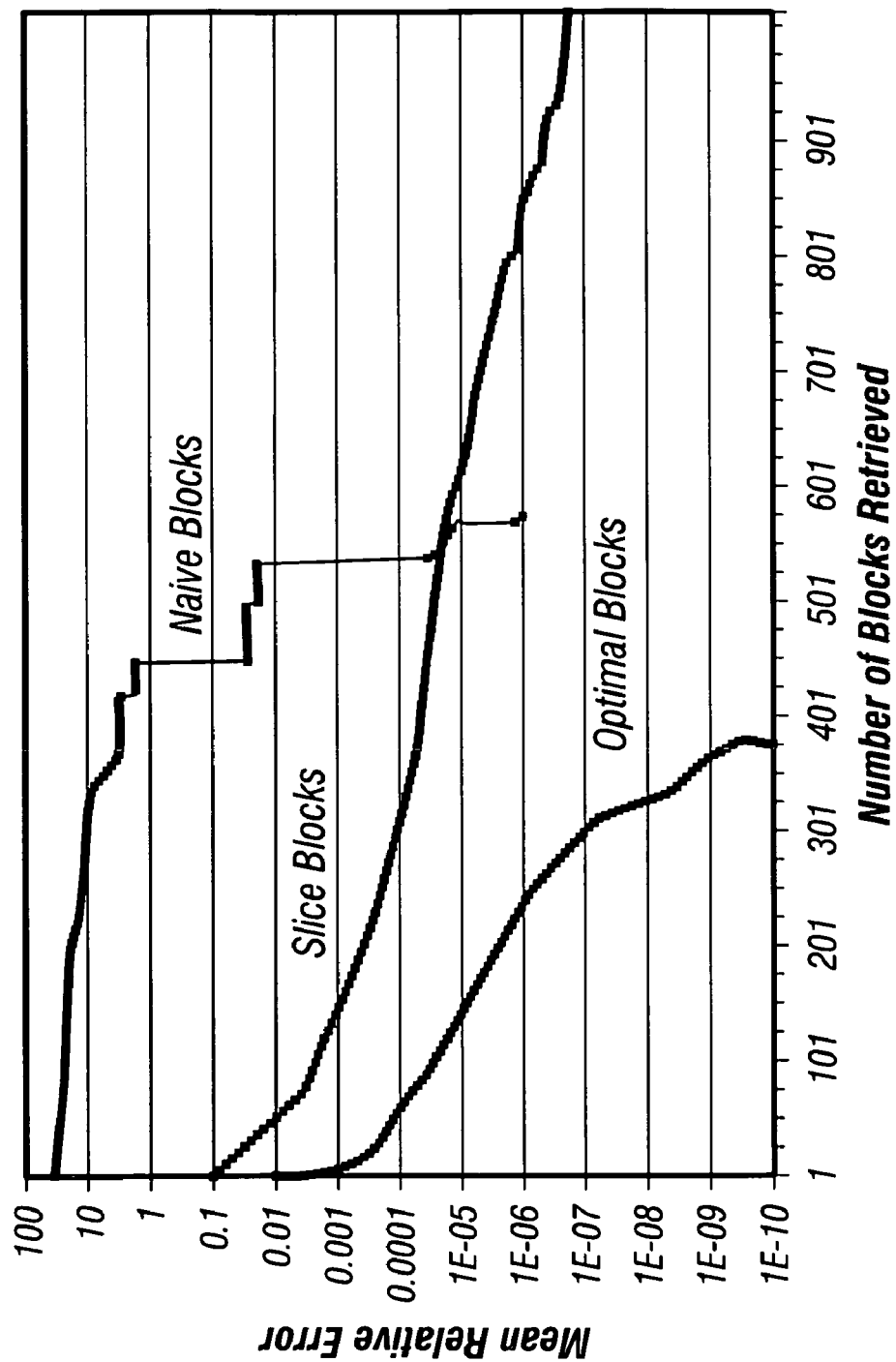

The approximation quality is measured in two ways. The first approach is data independent. $L_2$ is used as the importance function to minimize mean square error, and normalize so that the total importance of all columns in each query is one. The cumulative importance of all retrieved disk blocks is measured as the query progresses, aggregate the results over the randomly generated query workload, and report the results in FIG. 18.

The second measure of the approximation quality measures the accuracy of query answers on a real data set. Queries were progressively evaluated on the temperature dataset, described above, to report the mean relative error as a function of the number of disk blocks retrieved in FIG. 18($b$). The results are not surprising in light of FIG. 18($a$). The optimal placement performs extremely well, providing a mean relative error under 0.1% after retrieving only 10 disk blocks. The slice blocks also perform quite well, with mean relative error under 0.1% after retrieving 125 disk blocks. The naive approach performs terribly—mean relative error does not fall below 100% until the query evaluation is almost complete! Still after retrieving about 500 disk blocks the error for the naive approach falls of rapidly. This is because the naive approach only requires an average of 387 blocks to answer the query exactly. The reduction comes almost entirely from the fact that as queries results become exact, the relative error becomes zero.

A number of embodiments of the invention have been described. Nevertheless, it will be understood that various modifications may be made without departing from the spirit and scope of the invention.

What is claimed is:

1. A method for performing a range-sum query on a database of a database system, comprising:
   processing at least one query using a wavelet transformation in a computing system of the database system to produce a transformed query, wherein the transformed query comprises k wavelet coefficients; and
   the computing system performing a range-sum query on the database of the database system using the transformed query to produce a result.

2. The method of claim 1, wherein the processing of the query using a wavelets algorithm comprises filtering the query using a plurality of filters to produce a summary query.

3. The method of claim 2, wherein the summary query is processed using a wavelets algorithm and utilizing a plurality of filters to further refine the summary query to obtain a moment condition.

4. The method of claim 1, wherein the transformed query comprises a hierarchical list in decreasing order of wavelet coefficients.

5. The method of claim 1, wherein the database is a d-dimensional database.

6. The method of claim 5, wherein the d-dimensional database is a data cube.

7. The method of claim 1, wherein the wavelets algorithm is a modified Haar wavelet algorithm.

8. The method of claim 1, wherein n wavelet coefficients from the transformed query are used in the range-sum query of the database.

9. The method of claim 8, wherein n<k and the range-sum query is a progressive result.

10. The method of claim 8, wherein n=k and the range-sum query is an exact result.

11. The method of claim 1, wherein the at least one query comprises a plurality of queries.

12. The method of claim 11, wherein each of the plurality of queries is processed to produce a plurality of transformed queries each comprising k wavelet coefficients.

13. The method of claim 12, wherein the wavelet coefficients of each transformed query are compared to identify wavelet coefficients between the transformed queries that overlap and identifying the queries that overlap as important coefficients.

14. The method of claim 13, wherein the wavelet coefficients of the plurality of transformed queries are ranked in a table from most important to least important based upon their values and upon their importance.

15. The method of claim 14, wherein the range-sum query is performed by obtain a result for each wavelet coefficient in the table in descending order.

16. The method of claim 1, implemented in accordance with a computer program stored on a computer readable data storage device.

17. A method for performing a range-sum query in a database of a database system, comprising:
   a computing system of the database system receiving at least one query comprising at least one requested attribute;
   the computing system processing the at least one query to obtain a summary comprising identifying a plurality of coefficients fitting the at least one desired attribute by filtering the query using one or more filters repeating the filtering until a moment condition is obtained whereupon obtaining the moment condition the query is a transformed query;
   the computing system generating a transformed query table comprising a plurality of wavelet coefficients (k) comprising values in descending order;
   the computing system performing a range-sum query in the database of the database system using wavelet coefficient (n) of the transformed query beginning with the largest, wherein the data in the database includes a plurality of attributes and are represented as a d-dimensional data cube having a plurality of cells, the dimensions of the data cube corresponding respectively to the attributes, each cell having an aggregate value of the corresponding data attribute values, the transformed query defining a subset of the dimensions of the data cube;
   the computing system computing a plurality of range-sums based on the values corresponding to the data attributes in the subset; and
   the computing system generating an exact range-sum result when n=k or an approximate or progressive result when n<k.

18. The method as recited in claim 17, wherein the range-sum query corresponds to a d-dimensional region of the data cube.

19. An article of manufacture comprising:
   a computer-readable data storage device; and
   instructions on the computer-readable data storage device for directing a computer to:
      process at least one query using a wavelets algorithm to obtain a transformed query, wherein the transformed query comprises k wavelet coefficients; and
      perform a range-sum query on a database using the transformed query to produce a proximate, progressive, and/or exact result.

20. The article of manufacture of claim 19, wherein the processing of the query using a wavelets algorithm comprises filtering the query using a plurality of filters to produce a summary query.

21. The article of manufacture of claim 20, wherein the summary query is processed using a wavelets algorithm and utilizing a plurality of filters to further refine the summary query to obtain a moment condition.

22. The article of manufacture of claim 19, wherein the transformed query comprises a hierarchical list in decreasing order of wavelet coefficients.

23. The article of manufacture of claim 19, wherein the database is a d-dimensional database.

24. The article of manufacture of claim 23, wherein the d-dimensional database is a data cube.

25. The article of manufacture of claim 19, wherein the wavelets algorithm is a modified Haar wavelet algorithm.

26. The article of manufacture of claim 19, wherein n wavelet coefficients from the transformed query are used in the range-sum query of the database.

27. The article of manufacture of claim 26, wherein n<k and the range-sum query is a progressive result.

28. The article of manufacture of claim 26, wherein n=k and the range-sum query is an exact result.

29. The article of manufacture of claim 19, wherein each of the plurality of queries is processed to produce a plurality of transformed queries each comprising k wavelet coefficients.

30. The article of manufacture of claim 29, wherein the wavelet coefficients of each transformed query are compared to identify wavelet coefficients between the transformed queries that overlap and identifying the queries that overlap as important coefficients.

31. The article of manufacture of claim 30, wherein the wavelet coefficients of the plurality of transformed queries are ranked in a table from most important to least important based upon their values and upon their importance.

32. The article of manufacture of claim 31, wherein the range-sum query is performed by obtaining a result for each wavelet coefficient in the table in descending order.

33. A computer program on computer readable data storage device for causing a computer to:
   receive at least one query comprising at least one requested attribute;
   process the at least one query to obtain a summary comprising identifying a plurality of coefficients fitting the at least one desired attribute by filtering the query using one or more filters repeating the filtering until a moment condition is obtained whereupon obtaining the moment condition the query is a transformed query;
   generate a transformed query table comprising a plurality of wavelet coefficients (k) comprising values in descending order;
   perform a range-sum query in a database using wavelet coefficient (n) of the transformed query beginning with the largest, wherein the data in the database includes a plurality of attributes and are represented as a d-dimensional data cube having a plurality of cells, the dimensions of the data cube corresponding respectively to the attributes, each cell having an aggregate value of the corresponding data attribute values, the transformed query defining a subset of the dimensions of the data cube;
   compute a plurality of range-sums based on the values corresponding to the data attributes in the subset; and
   generate an exact range-sum result when n=k or an approximate or progressive result when n<k.

34. A database system for performing a range-sum query in a database, the database system comprising:
   a computer readable data storage device comprising instructions for causing a computer to:
      process at least one query using a wavelets algorithm to obtain a transformed query, wherein the transformed query comprises k wavelet coefficients; and
      perform a range-sum query on a database using the transformed query to produce a proximate, progressive, and/or exact result.

35. A database system for performing a range-sum query in a database, the database system comprising:
   a computer readable data storage device comprising instructions for causing a computer to:
      receive at least one query comprising at least one requested attribute;

process the at least one query to obtain a summary comprising identifying a plurality of coefficients fitting the at least one desired attribute by filtering the query using one or more filters repeating the filtering until a moment condition is obtained whereupon obtaining the moment condition the query is a transformed query;

generate a transformed query table comprising a plurality of wavelet coefficients (k) comprising values in descending order;

perform a range-sum query in a database using wavelet coefficient (n) of the transformed query beginning with the largest, wherein the data in the database includes a plurality of attributes and are represented as a d-dimensional data cube having a plurality of cells, the dimensions of the data cube corresponding respectively to the attributes, each cell having an aggregate value of the corresponding data attribute values, the transformed query defining a subset of the dimensions of the data cube;

compute a plurality of range-sums based on the values corresponding to the data attributes in the subset; and generate an exact range-sum result when n=k or an approximate or progressive result when n<k.

* * * * *